United States Patent
Onishi et al.

(10) Patent No.: US 12,340,947 B2
(45) Date of Patent: Jun. 24, 2025

(54) MULTILAYER CERAMIC CAPACITOR

(71) Applicant: Murata Manufacturing Co., Ltd., Nagaokakyo (JP)

(72) Inventors: Kosuke Onishi, Nagaokakyo (JP); Satoshi Muramatsu, Nagaokakyo (JP); Yukie Watanabe, Nagaokakyo (JP); Ryo Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 133 days.

(21) Appl. No.: 18/122,177

(22) Filed: Mar. 16, 2023

(65) Prior Publication Data

US 2023/0307186 A1  Sep. 28, 2023

(30) Foreign Application Priority Data

Mar. 26, 2022  (JP) ................. 2022-050981

(51) Int. Cl.
*H01G 4/30* (2006.01)
*H01G 4/232* (2006.01)

(52) U.S. Cl.
CPC ............. *H01G 4/30* (2013.01); *H01G 4/232* (2013.01)

(58) Field of Classification Search
CPC ............ H01G 4/30; H01G 4/232; H01G 4/32
See application file for complete search history.

(56) References Cited

U.S. PATENT DOCUMENTS

| 6,859,352 B1 * | 2/2005 | Kanasaki | H05K 1/0231 |
| | | | 257/E23.079 |
| 10,026,558 B1 * | 7/2018 | Lee | H01G 2/065 |
| 2006/0281297 A1 * | 12/2006 | Ogawa | H01L 23/5389 |
| | | | 257/E23.173 |
| 2010/0151271 A1 * | 6/2010 | Wei | C23C 28/34 |
| | | | 428/432 |
| 2015/0302991 A1 * | 10/2015 | Choi | H01G 4/232 |
| | | | 361/301.4 |

(Continued)

FOREIGN PATENT DOCUMENTS

| JP | 2001297944 A | 10/2001 |
| JP | 2008205135 A | 9/2008 |

(Continued)

OTHER PUBLICATIONS

Office Action in JP2022-050981, mailed Feb. 20, 2024, 6 pages.

*Primary Examiner* — Michael P McFadden
(74) *Attorney, Agent, or Firm* — Keating & Bennett, LLP

(57) ABSTRACT

A multilayer ceramic capacitor includes a ceramic body including ceramic layers, first internal electrodes, and second internal electrodes laminated in a height direction, a first external electrode on at least part of a first end surface and on part of a first main surface and not on a second main surface, the first external electrode being electrically connected to the first internal electrodes, a second external electrode on at least part of a second end surface and on part of the first main surface and is not on the second main surface, the second external electrode being electrically connected to the second internal electrodes, at least two penetration portions penetrating the ceramic body between the first and second main surfaces, and a reinforcing layer on at least part of the second main surface, the reinforcing layer covering the at least two penetration portions exposed from the ceramic body.

17 Claims, 17 Drawing Sheets

(56) References Cited

U.S. PATENT DOCUMENTS

| | | | |
|---|---|---|---|
| 2018/0068793 A1* | 3/2018 | Lee | H01G 4/232 |
| 2018/0233287 A1* | 8/2018 | Seo | H01G 4/012 |
| 2020/0066449 A1 | 2/2020 | Tsutsumi et al. | |
| 2020/0135400 A1* | 4/2020 | Sakurai | H01G 4/232 |
| 2020/0152382 A1* | 5/2020 | Sakurai | H01G 4/248 |
| 2021/0233713 A1 | 7/2021 | Nishimura | |
| 2022/0230811 A1* | 7/2022 | Lee | H01G 2/02 |

FOREIGN PATENT DOCUMENTS

| | | |
|---|---|---|
| JP | 2018182298 A | 11/2018 |
| JP | 2021118239 A | 8/2021 |
| WO | 2018/220901 A1 | 12/2018 |

* cited by examiner

FIG.12A
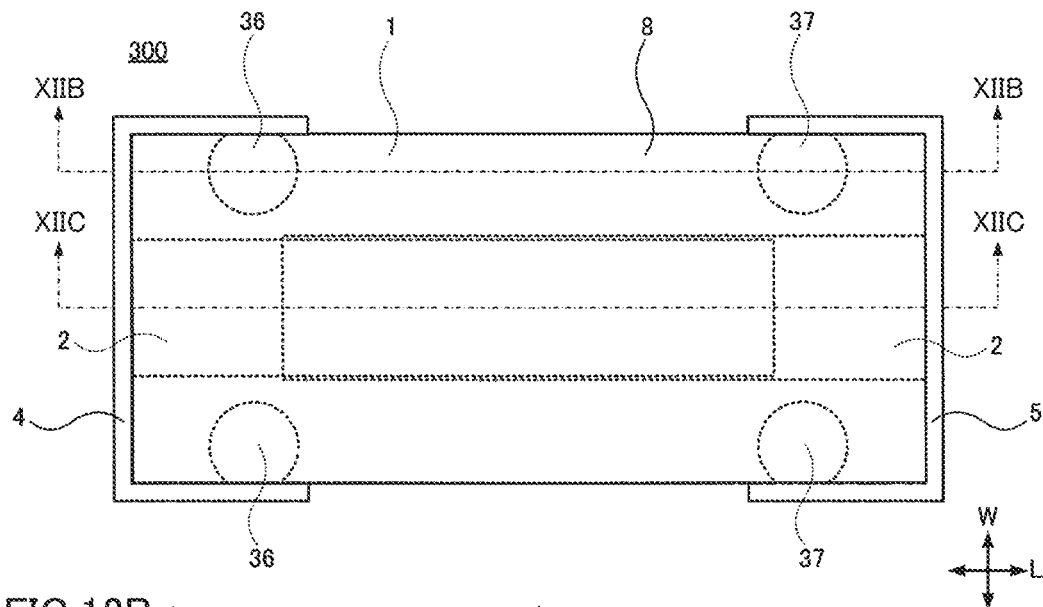
FIG.12B (CROSS-SECTION XIIB-XIIB)
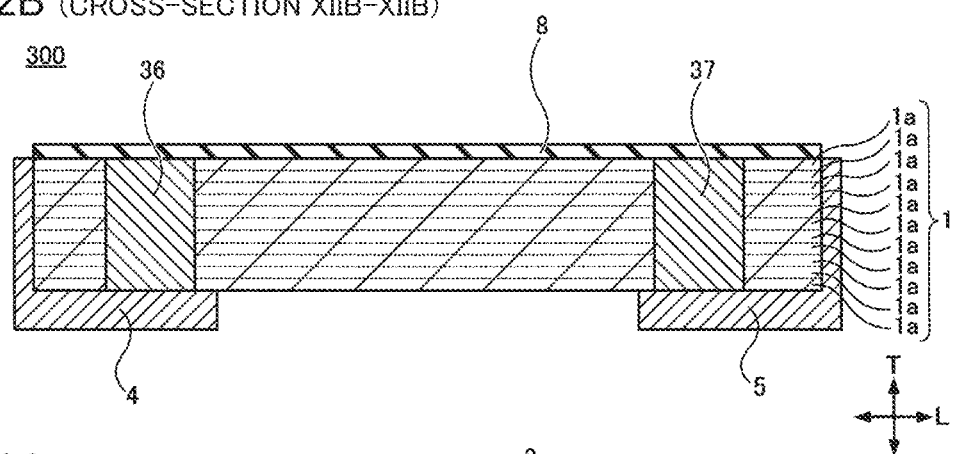
FIG.12C (CROSS-SECTION XIIC-XIIC)
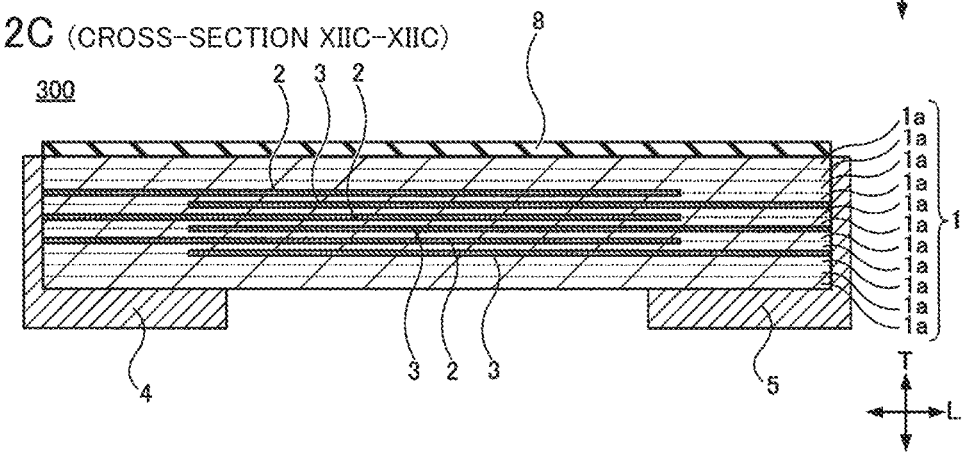

FIG.13A
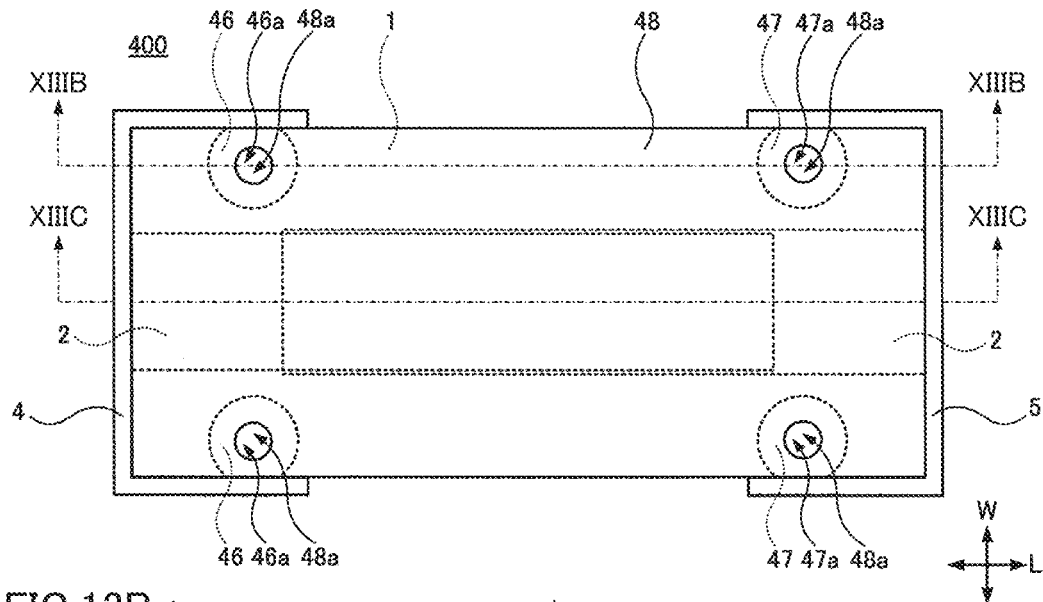
FIG.13B (CROSS-SECTION XIIIB-XIIIB)
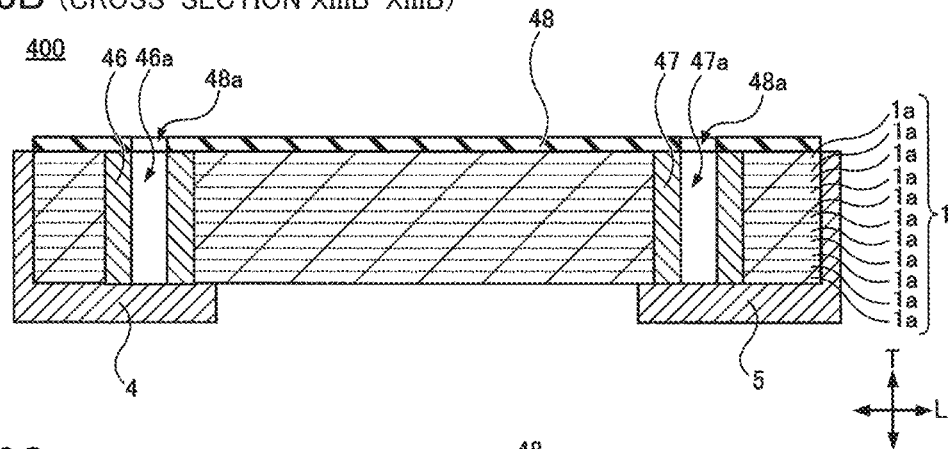
FIG.13C (CROSS-SECTION XIIIC-XIIIC)
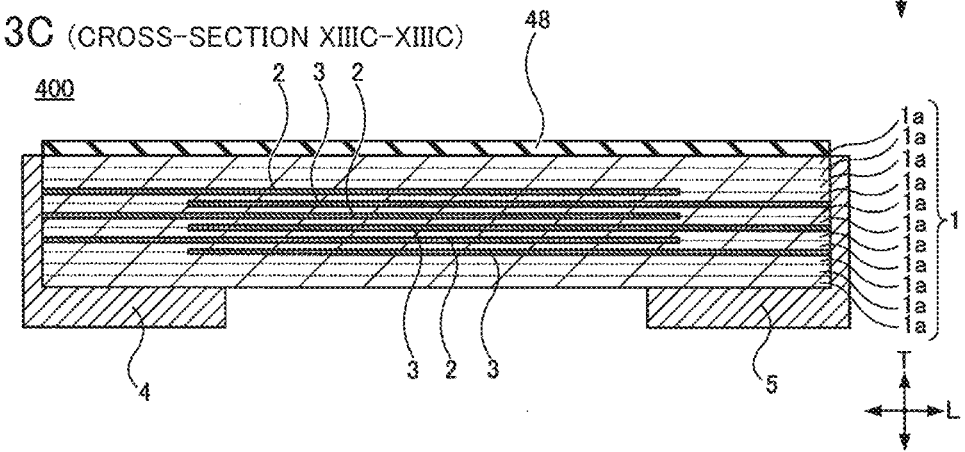

MULTILAYER CERAMIC CAPACITOR

CROSS REFERENCE TO RELATED APPLICATIONS

This nonprofessional application is based on Japanese Patent Application No. 2022-050981 filed on Mar. 26, 2022 with the Japan Patent Office, the entire contents of which are hereby incorporated by reference.

BACKGROUND OF THE INVENTION

1. Field of the Invention

The present invention relates to multilayer ceramic capacitors, and more particularly, to a multilayer ceramic capacitor including a penetration portion penetrating a ceramic body, and a reinforcing layer on a surface of the ceramic body.

2. Description of the Related Art

Multilayer ceramic capacitors have been widely used for electronic devices and electrical devices. A conventional, common multilayer ceramic capacitor includes cap-shaped external electrodes respectively formed at the opposite ends of a ceramic body. In other words, the external electrodes are not only formed on end surfaces of the ceramic body but also formed to extend from the end surfaces to parts of the opposite main surfaces (a mounting surface and a top surface) and parts of the opposite side surfaces. Such an extending portion may be referred to as a folded portion of the external electrode.

In recent years, the electronic devices and electrical devices have become smaller in size and weight, and also, an electronic component including a multilayer ceramic capacitor has been demanded to have reduced size and weight. As a multilayer ceramic capacitor that meets such demands, a multilayer ceramic capacitor including L-shaped external electrodes is known.

WO 2018/220901 A1 discloses a multilayer ceramic capacitor (ceramic electronic component) including L-shaped external electrodes. FIG. 17 shows a multilayer ceramic capacitor 1000 disclosed in WO 2018/220901 A1.

Multilayer ceramic capacitor 1000 includes a ceramic body 101. Inside ceramic body 101, internal electrodes 102, 103 are provided. Internal electrode 102 is extended to one end surface of ceramic body 101, and internal electrode 103 is extended to the other end of ceramic body 101.

An external electrode 104 is provided at one end of ceramic body 101, and an external electrode 105 is provided at the other end of ceramic body 101. Internal electrode 102 is electrically connected to external electrode 104, and internal electrode 103 is electrically connected to external electrode 105.

External electrode 104 is provided on one end surface of ceramic body 101 and part of a main surface on the mounting surface side and is not provided on a main surface on the top surface side. Similarly, external electrode 105 is provided on the other end surface of ceramic body 101 and part of the main surface on the mounting surface side and is not provided on the main surface on the top surface side. When a cross-section of multilayer ceramic capacitor 1000 taken along a surface parallel to the side surface is viewed, external electrodes 104, 105 each have an L shape. External electrodes 104, 105 are thus referred to as L-shaped external electrodes.

Multilayer ceramic capacitor 1000 including external electrodes 104, 105, which are L-shaped external electrodes, includes no external electrodes on the main surface of ceramic body 101 on the top surface side, and thus has a smaller thickness (lower profile), leading to reduced size. Also, portions of the external electrodes are omitted, leading to reduced weight.

SUMMARY OF THE INVENTION

As described above, the electronic component including the multilayer ceramic capacitor has been demanded to have reduced size and weight. Nowadays, an ultrathin multilayer ceramic capacitor having a height dimension of about 100 μm or less is being put to practical use.

The electronic component including the multilayer ceramic capacitor is commonly suctioned with a mounter including a vacuum suction nozzle and is frequently mounted on a substrate or the like.

Under these circumstances, in the multilayer ceramic capacitor that has a smaller thickness and includes L-shaped external electrodes, the ceramic body may crack or chip due to an impact when it is mounted on a substrate or the like with a mounter. This may lead deterioration of insulation resistance (IR) or electrical disconnection (breaking) between the internal electrode and the external electrode, causing fluctuations in electrical characteristics. In other words, the external electrode, which has an L shape rather than a cap shape, fails to sufficiently protect the ceramic body, and thus, an impact may cause cracking or chipping of the ceramic body or electrical disconnection between the internal electrode and the external electrode.

A multilayer ceramic capacitor according to a preferred embodiment of the present invention includes a ceramic body including a plurality of ceramic layers, a plurality of first internal electrodes, and a plurality of second internal electrodes laminated in a height direction, the ceramic body including a first main surface and a second main surface facing each other in the height direction, a first end surface and a second end surface facing each other in a length direction orthogonal to the height direction, and a first side surface and a second side surface facing each other in a width direction orthogonal to the height direction and the length direction, a first external electrode that is provided on at least part of the first end surface and on part of the first main surface and is not provided on the second main surface, the first external electrode being electrically connected to the plurality of first internal electrodes, a second external electrode that is provided on at least part of the second end surface and on part of the first main surface and is not provided on the second main surface, the second external electrode being electrically connected to the plurality of second internal electrodes, at least two penetration portions penetrating the ceramic body between the first main surface and the second main surface, and a reinforcing layer provided on at least part of the second main surface of the ceramic body, the reinforcing layer covering the at least two penetration portions exposed from the ceramic body.

In a multilayer ceramic capacitor according to a preferred embodiment of the present invention, cracking or chipping of the ceramic body or electrical disconnection between the internal electrode and the external electrode, which is caused by impact, is reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12A is a perspective plan view of a multilayer ceramic capacitor 300, FIG. 12B is a sectional view of multilayer ceramic capacitor 300, which shows a portion XIIB-XIIB indicated by the long-dashed short-dashed arrow in FIG. 12A, and FIG. 12C is a sectional view of multilayer ceramic capacitor 300, which shows a portion XIIC-XIIC indicated by the long-dashed short-dashed arrow in FIG. 12A.

FIG. 13A is a perspective plan view of a multilayer ceramic capacitor 400, FIG. 13B is a sectional view of multilayer ceramic capacitor 400, which shows a portion XIIIB-XIIIB indicated by the long-dashed short-dashed arrow in FIG. 13A, and FIG. 13C is a sectional view of multilayer ceramic capacitor 400, which shows a portion XIIIC-XIIIC indicated by the long-dashed short-dashed arrow in FIG. 13A.

DETAILED DESCRIPTION OF THE PREFERRED EMBODIMENTS

Figure 1:
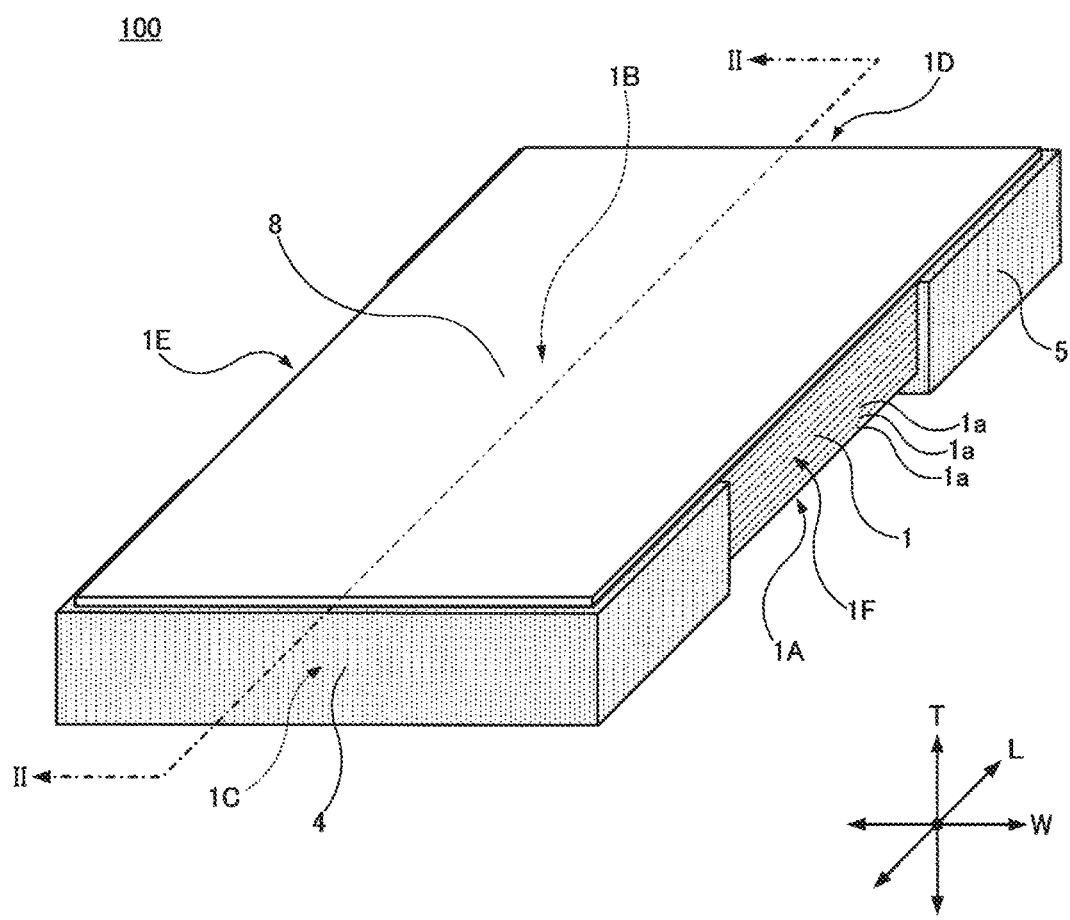
FIG. 1 is a perspective view of a multilayer ceramic capacitor 100.

Preferred embodiments of the present invention will now be described with reference to the drawings.

Each preferred embodiment is merely an example of illustration and example only, and the present invention is not limited to the contents of the preferred embodiments. It is also possible to implement the contents described in different preferred embodiments in combination, and the contents of such implementation are also included within the scope of the present invention. Further, the drawings are provided to facilitate understanding of the specification. Some of the drawings are schematically drawn, and a dimensional ratio between drawn components may not match a dimensional ratio between the components described herein. Further, the components described herein may be omitted in the drawings, or the number of components drawn may be reduced.

First Preferred Embodiment

Figure 2:
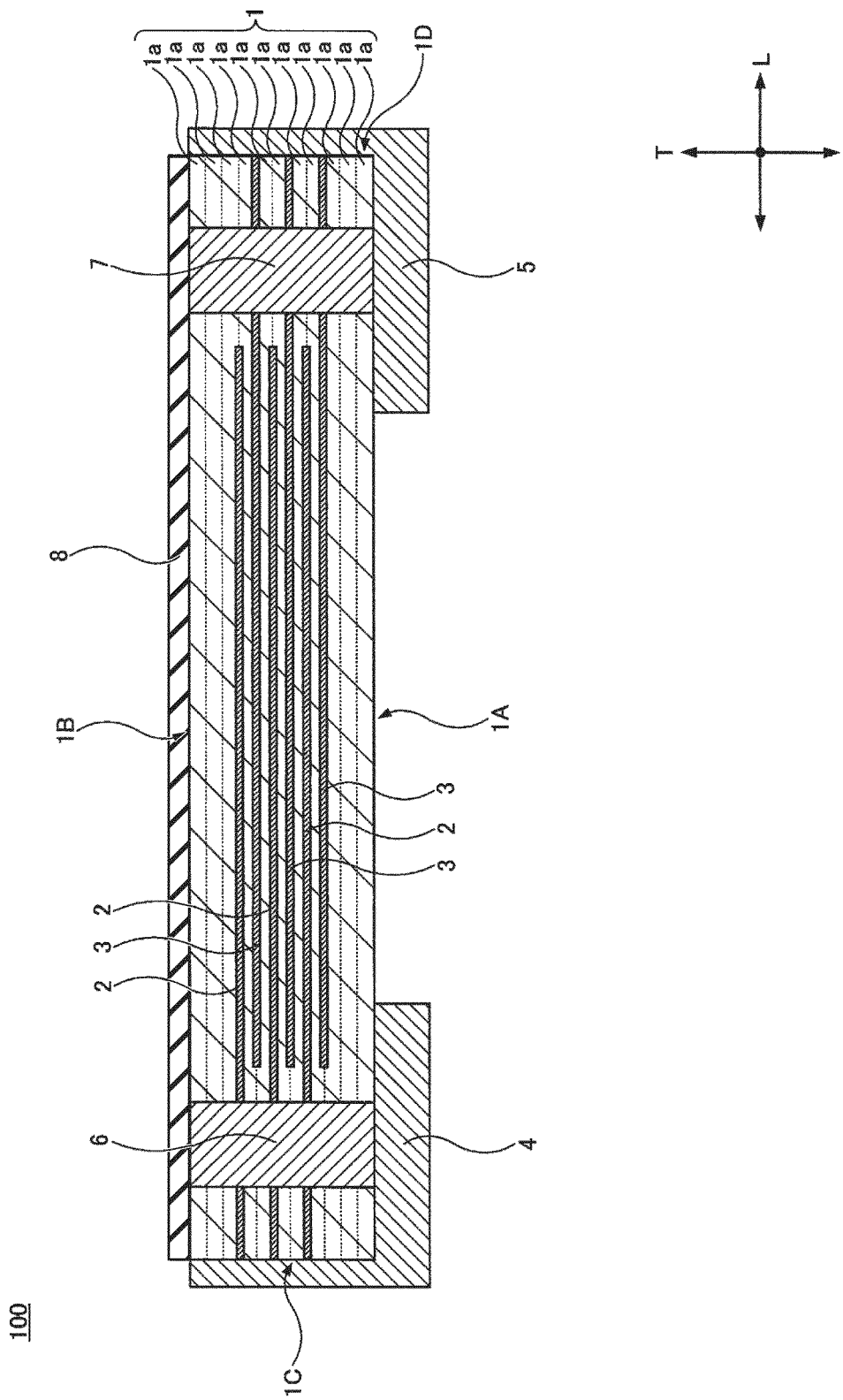
FIG. 2 is a sectional view of multilayer ceramic capacitor 100, which shows a portion II-II indicated by the long-dashed short-dashed arrow in FIG. 1.
Figure 3:
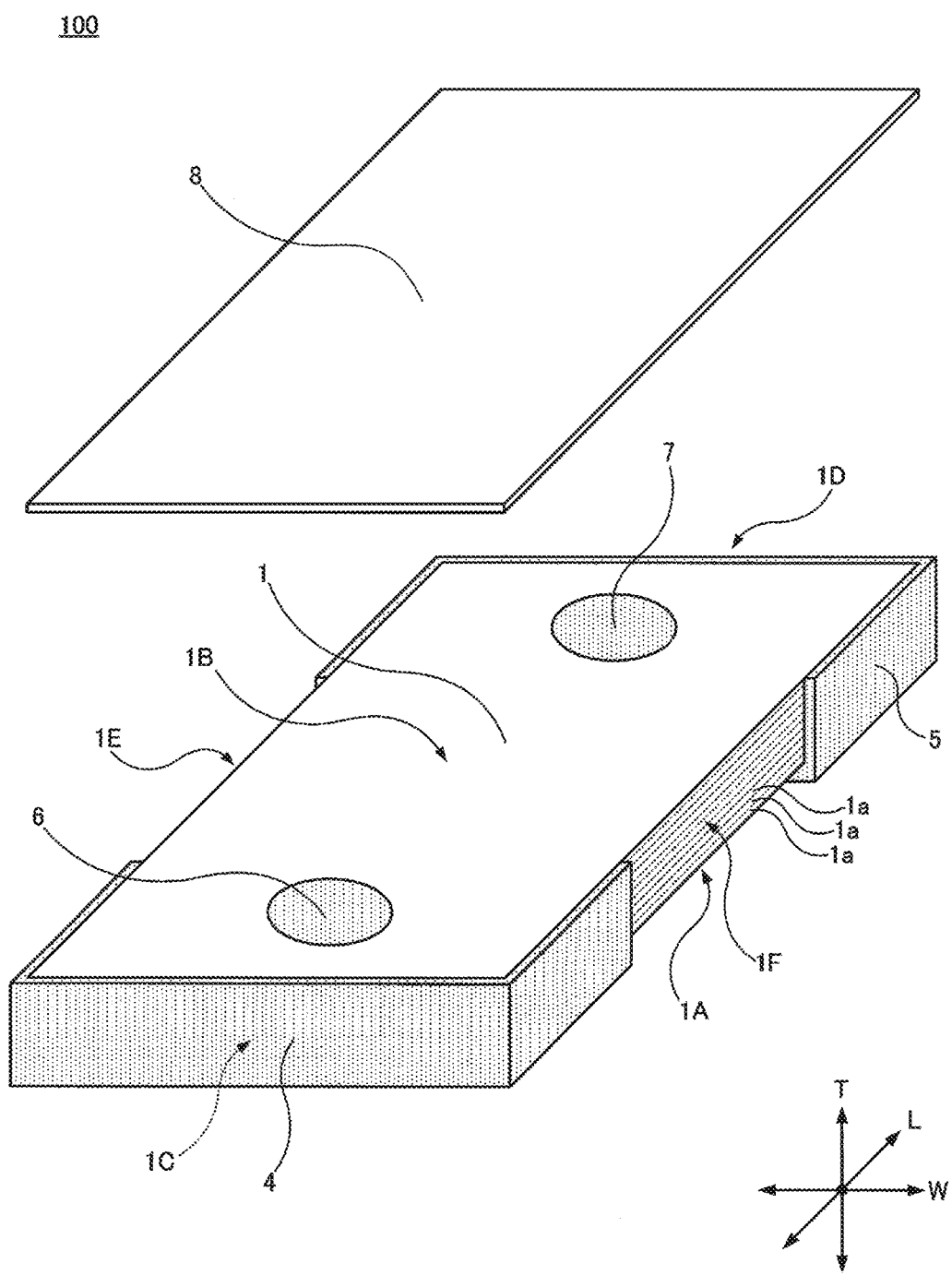
FIG. 3 is an exploded perspective view of multilayer ceramic capacitor 100.
Figure 4:
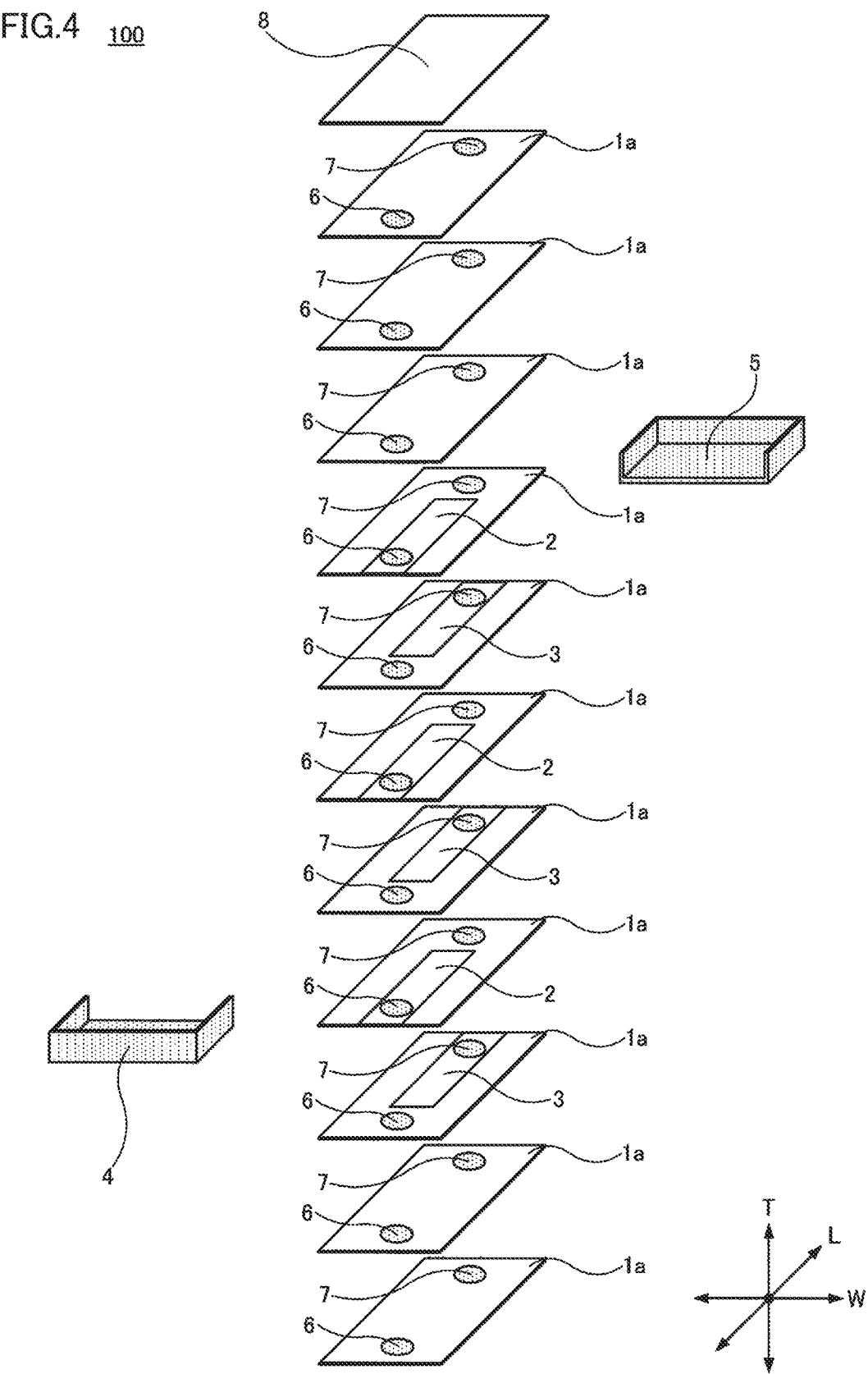
FIG. 4 is an exploded perspective view of multilayer ceramic capacitor 100.

FIGS. 1 to 4 show a multilayer ceramic capacitor 100 according to a first preferred embodiment. FIG. 1 is a perspective view of multilayer ceramic capacitor 100. FIG. 2 is a sectional view of multilayer ceramic capacitor 100, which shows a portion II-II indicated by the long-dashed short-dashed arrow in FIG. 1. FIG. 3 is an exploded perspective view of multilayer ceramic capacitor 100, which shows a state in which a reinforcing layer 8, which will be described later, is removed from a ceramic body 1, which will be described later. FIG. 4 is also an exploded perspective view of multilayer ceramic capacitor 100, which shows a state in which a first external electrode 4 and a second external electrode 5, which will be described later, are removed from ceramic body 1 and ceramic body 1 is disassembled into a plurality of ceramic layers 1a, which will be described later. Each figure shows a height direction T, a length direction L, and a width direction W of multilayer ceramic capacitor 100, and these directions may be mentioned in the description below. In the present preferred embodiment, the direction in which ceramic layers 1a are laminated is height direction T.

Multilayer ceramic capacitor 100 includes ceramic body 1 including a laminate of ceramic layers 1a. Ceramic body 1 has a rectangular or substantially rectangular parallelepiped shape and includes a first main surface 1A and a second main surface 1B facing each other in height direction T, a first end surface 1C and a second end surface 1D facing each other in length direction L orthogonal to height direction T, and a first side surface 1E and a second side surface 1F facing each other in width direction W orthogonal to height direction T and length direction L. In ceramic body 1, first main surface 1A is a mounting surface, and second main surface 1B is a top surface.

Ceramic body 1 (ceramic layer 1a) is made of any material, and for example, may be made of dielectric ceramic mainly including $BaTiO_3$. Alternatively, a dielectric ceramic mainly including any other material in place of $BaTiO_3$, such as $CaTiO_3$, $SrTiO_3$, or $CaZrO_3$, may be used.

Any number of ceramic layers 1a may be provided. Ceramic layer 1a may have any thickness dimension, and preferably, has a thickness dimension of about 0.3 μm or more and about 3.0 μm or less, for example. Ceramic body 1 may also have any dimensions, and in the present preferred embodiment, has a dimension of about 100 μm in height direction T, a dimension of about 400 μm in length direction L, and a dimension of about 200 μm in width direction W, for example.

Ceramic body 1 includes a first internal electrode 2 between predetermined layers and a second internal electrode 3 between other predetermined layers. First internal electrode 2 is extended to first end surface 1C of ceramic body 1. Second internal electrode 3 is extended to second end surface 1D of ceramic body 1.

Each of first internal electrode 2 and second internal electrode 3 includes two or more layers. First internal electrodes 2 and second internal electrodes 3 are usually arranged alternately in height direction T. Each of first internal electrode 2 and second internal electrode 3 may have any thickness dimension, and preferably, has a thickness dimension of about 0.1 μm or more and about 2.0 μm or less, for example.

Each of first internal electrode 2 and second internal electrode 3 may be mainly made of any material, and is mainly made of Ni in the present preferred embodiment. Alternatively, any other metal such as Cu, Ag, Pd, or Au may be used in place of Ni. Ni, Cu, Ag, Pd, or Au may be an alloy including any other metal.

First external electrode 4 is provided at one end of ceramic body 1. First external electrode 4 is an L-shaped external electrode. In other words, when a cross-section of multilayer ceramic capacitor 100 taken along the surface parallel to first side surface 1E and second side surface 1F is viewed, first external electrode 4 has an L shape. Specifically, in ceramic body 1, first external electrode 4 is provided on the entire first end surface 1C, part of first main surface 1A, part of first side surface 1E, and part of second side surface 1F, and is not provided on second main surface 1B. First external electrode 4 on first side surface 1E and second side surface 1F may be omitted.

Second external electrode 5 is provided at the other end of ceramic body 1. Second external electrode 5 is also an L-shaped external electrode. Specifically, in ceramic body 1, second external electrode 5 is provided on the entire second end surface 1D, part of first main surface 1A, part of first side surface 1E, and part of second side surface 1F, and is not provided on second main surface 1B. Second external electrode 5 on first side surface 1E and second side surface 1F may be omitted.

First external electrode 4 is electrically connected to first internal electrode 2 on first end surface 1C of ceramic body 1. Second external electrode 5 is electrically connected to second internal electrode 3 on second end surface 1D of ceramic body 1.

Each of first external electrode 4 and second external electrode 5 may have any structure, may be mainly made of any material, and may be formed by any method. In the present preferred embodiment, each of first external electrode 4 and second external electrode 5 has a multilayer structure including a first layer formed by baking of a conductive paste, a second layer, a third layer, and a fourth layer formed by plating. Specifically, the first layer formed by baking of a conductive paste mainly includes Ni. Alternatively, any other metal such as Cu, Ag, Pd, or Au may be used in place of Ni. Ni, Cu, Ag, Pd, or Au may be an alloy including any other metal. The second layer, the third layer, and the fourth layer formed by plating mainly include Cu, Ni, and, Sn, respectively. For enhanced visibility, in the sectional view of FIG. 3, each of first external electrode 4 and second external electrode 5 is not shown in multiple layers (the first layer to the fourth layer) but is shown in one layer.

First external electrode 4 may have any thickness dimension, and in the present preferred embodiment, the thickness dimension is about 10 μm on first main surface 1A and about 10 μm on first end surface 1C in ceramic body 1, for example. Similarly, second external electrode 5 may have any thickness dimension, and in the present preferred embodiment, the thickness dimension is about 10 μm on first main surface 1A and about 10 μm on second end surface 1D in ceramic body 1, for example.

Multilayer ceramic capacitor 100 includes a first penetration portion 6 and a second penetration portion 7 penetrating ceramic body 1 between first main surface 1A and second main surface 1B. In the present preferred embodiment, first penetration portion 6 and second penetration portion 7 are made of metal. Thus, first penetration portion 6 and second penetration portion 7 are electrically conductive.

Each of first penetration portion 6 and second penetration portion 7 may be mainly made of any specific component (metal), and Ni is used in the present preferred embodiment. Alternatively, any other metal such as Cu, Ag, Pd, or Au may be used in place of Ni. Ni, Cu, Ag, Pd, or Au may be an alloy including any other metal. Each of first penetration portion 6 and second penetration portion 7 may be made of conductive resin or the like rather than metal.

First penetration portion 6 and second penetration portion 7 are provided to reduce or minimize the influence of an impact (a stress), which may be applied to ceramic body 1, on ceramic body 1. In other words, first penetration portion 6 and second penetration portion 7 have the function of releasing any impact applied from one direction to the opposite direction after reducing or minimizing the influence of the impact on ceramic body 1. First penetration portion 6 and second penetration portion 7 also have the function of mitigating, absorbing, or supporting impacts from the opposite directions (from both of upward and downward directions) so as to reduce or minimize the influence of the impacts on ceramic body 1.

First penetration portion 6 and second penetration portion 7 may have any shape, and have a cylindrical shape in the present preferred embodiment. First penetration portion 6 and second penetration portion 7 may have any other columnar shape in place of the cylindrical shape, such as a quadrangular prism shape or a pentagonal prism shape. First penetration portion 6 and second penetration portion 7 may have any dimensions, and have a diameter of about 30 μm in the present preferred embodiment, for example. The dimension of each of first penetration portion 6 and second penetration portion 7 in height direction T is the same or substantially the same as the dimension of ceramic body 1 in height direction T.

First penetration portion 6 is electrically connected to first internal electrode 2 inside ceramic body 1. First penetration portion 6 is also electrically connected to first external electrode 4 on first main surface 1A of ceramic body 1.

Second penetration portion 7 is electrically connected to second internal electrode 3 inside ceramic body 1. Second penetration portion 7 is electrically connected to second external electrode 5 on first main surface 1A of ceramic body 1.

Reinforcing layer 8 is provided on second main surface 1B of ceramic body 1. Reinforcing layer 8 is provided to improve the mechanical strength of ceramic body 1. In other words, reinforcing layer 8 is provided to mitigate an impact (a stress) applied to ceramic body 1.

Reinforcing layer 8 may be made of any material, and is made of diamond-like carbon (DLC) in the present preferred embodiment. DLC is high in hardness, abrasion resistance, corrosion resistance, and the like. DLC also has sufficient electrical insulation properties. Reinforcing layer 8 may have any dimensions, and has a thickness of about 5 μm in the present preferred embodiment, for example. This is because such a value is necessary and sufficient to improve the mechanical strength of ceramic body 1.

Reinforcing layer 8 covers first penetration portion 6 and second penetration portion 7 exposed from second main surface 1B of ceramic body 1. In the present preferred embodiment, reinforcing layer 8 is provided on the entire second main surface 1B of ceramic body 1. However, reinforcing layer 8 is only required to cover at least first penetration portion 6 and second penetration portion 7 exposed from second main surface 1B of ceramic body 1.

Multilayer ceramic capacitor 100 includes L-shaped external electrodes as first external electrode 4 and second external electrode 5, as described above. The primary object of this is a reduction in thickness (profile), and the use of L-shaped external electrodes as first external electrode 4 and second external electrode 5 is highly preferable in terms of mitigating an impact applied to ceramic body 1 from the second main surface 1B side. In other words, when L-shaped external electrodes are used as first external electrode 4 and second external electrode 5, second main surface 1B of ceramic body 1 is flat with no external electrodes provided thereon, and reinforcing layer 8 provided on second main surface 1B is also flat. In contrast, if first external electrode 4 and second external electrode 5 have a cap shape in which the external electrode is also provided on second main surface 1B of ceramic body 1, reinforcing layer 8 provided on second main surface 1B is not flat, causing a step. Flat reinforcing layer 8 more effectively mitigates (absorbs) an impact than reinforcing layer 8 with a step. Multilayer ceramic capacitor 100 including L-shaped external electrodes as first external electrode 4 and second external electrode 5 can flatten reinforcing layer 8, and accordingly, more effectively mitigates an impact than when multilayer ceramic capacitor 100 includes capped external electrodes.

Example Method of Mounting Multilayer Ceramic Capacitor 100

Figure 5A:
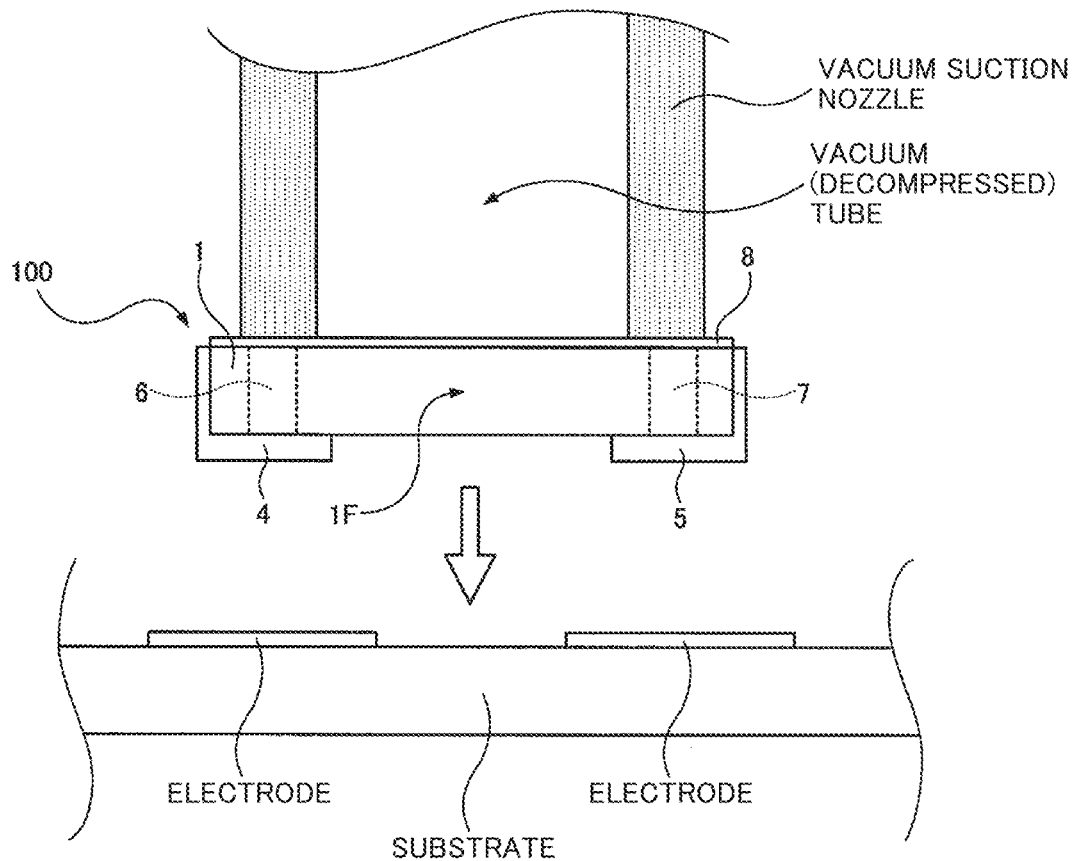
FIGS. 5A and 5B are diagrams for illustrating an example method of mounting multilayer ceramic capacitor 100.
Figure 5B:
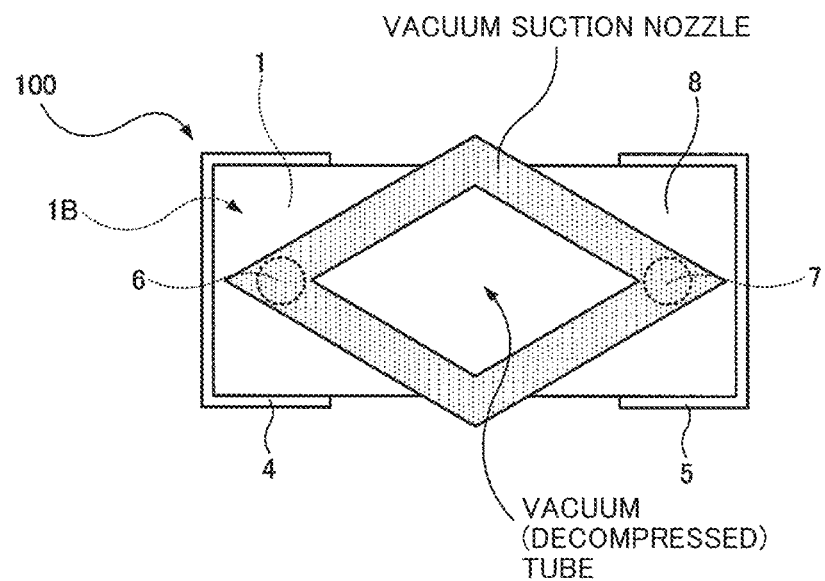

Multilayer ceramic capacitor 100 is, for example, mounted on a substrate or the like by a method shown in FIGS. 5A and 5B. FIGS. 5A and 5B are diagrams for illustrating an example method of mounting multilayer ceramic capacitor 100. FIG. 5A shows multilayer ceramic capacitor 100 to be mounted, which is viewed from the second side surface 1F direction of ceramic body 1. FIG. 5B shows multilayer ceramic capacitor 100 to be mounted, which is viewed from the second main surface 1B direction of ceramic body 1.

First, multilayer ceramic capacitor 100 is sucked by a vacuum suction nozzle on reinforcing layer 8 on second main surface 1B of ceramic body 1. A tube is inside the vacuum suction nozzle. In suction of multilayer ceramic capacitor 100, the tube is evacuated, or the pressure inside the tube is reduced below atmospheric pressure.

Subsequently, the vacuum suction nozzle is moved, and thus, multilayer ceramic capacitor 100 sucked by the vacuum suction nozzle is placed on the substrate.

Subsequently, the pressure in the tube of the vacuum suction nozzle is made equal to atmospheric pressure. As a result, multilayer ceramic capacitor 100 becomes detached from the vacuum suction nozzle. Then, multilayer ceramic capacitor 100 is fixed to the electrode of the substrate by, for example, reflow soldering to be electrically connected thereto. Thus, mounting of multilayer ceramic capacitor 100 on the substrate or the like is complete.

In the above process, a large impact is applied to multilayer ceramic capacitor 100 when multilayer ceramic capacitor 100 is placed on the substrate with the vacuum suction nozzle. More specifically, strong impacts are applied to multilayer ceramic capacitor 100 from both the vacuum suction nozzle side and the substrate side. In a conventional multilayer ceramic capacitor having a reduced thickness and including L-shaped external electrodes, a ceramic body may crack or chip, or an internal electrode and an external electrode may be electrically disconnected.

In contrast, in multilayer ceramic capacitor 100, such an impact is mitigated by reinforcing layer 8. In multilayer ceramic capacitor 100, also, such an impact is mitigated by first penetration portion 6 and second penetration portion 7. More accurately, the influence of an impact on ceramic body 1 is mitigated by reinforcing layer 8, first penetration portion 6, and second penetration portion 7.

In order to enhance such effects, when multilayer ceramic capacitor 100 is sucked by the vacuum suction nozzle, the vacuum suction nozzle is preferably brought into contact with the portions of multilayer ceramic capacitor 100 where first penetration portion 6 and second penetration portion 7 are located, as shown in FIGS. 5A and 5B.

In multilayer ceramic capacitor 100 according to the present preferred embodiment, an impact caused in mounting of multilayer ceramic capacitor 100 on a substrate or the like is mitigated by reinforcing layer 8, first penetration portion 6, and second penetration portion 7. Thus, cracking or chipping of ceramic body 1 is reduced or prevented, and also, electrical disconnection between first internal electrode 2 and first external electrode 4 and electrical disconnection between second internal electrode 3 and second external electrode 5 are reduced or prevented.

In multilayer ceramic capacitor 100, insulation resistance (IR) degradation caused by cracking or chipping of ceramic body 1 is reduced or prevented. In multilayer ceramic capacitor 100, also, fluctuations of electrical characteristics are reduced or prevented which are caused by electrical disconnection (breaking) between first internal electrode 2 and first external electrode 4 and electrical disconnection (breaking) between second internal electrode 3 and second external electrode 5.

Example Method of Manufacturing Multilayer Ceramic Capacitor 100

Multilayer ceramic capacitor 100 can be manufactured by a manufacturing method shown in FIGS. 6A to 6C and 7D to 7F.

Figure 6A:
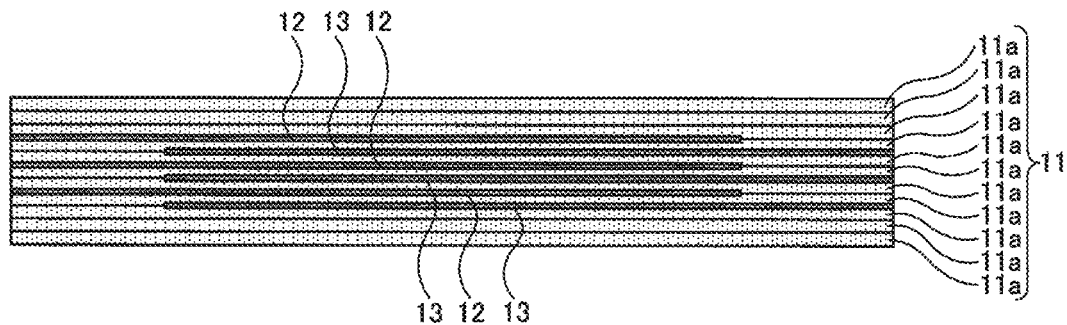
FIGS. 6A to 6C are diagrams for illustrating a process performed in the example method of manufacturing multilayer ceramic capacitor 100.

First, an unfired ceramic body 11 shown in FIG. 6A is produced. Unfired ceramic body 11 includes ceramic green sheets 11a, conductive pastes 12 for forming first internal electrodes 2, and conductive pastes 13 for forming second internal electrodes 3, which are laminated and pressurized to be integrated.

Though not shown, first, powdered dielectric ceramic, a binder resin, a solvent, and the like are prepared, and they are subjected to wet blending, to thereby produce a ceramic slurry.

Subsequently, the ceramic slurry is applied onto a carrier film in the form of a sheet with a die coater, a gravure coater, a micro gravure coater, or any other coater, and dried, to thereby produce a ceramic green sheet.

Subsequently, in order to form first internal electrode 2 and second internal electrode 3 on the main surface of a predetermined ceramic green sheet, conductive pastes 12, 13 prepared in advance are applied (e.g., printed) in a desired pattern shape. No conductive paste is applied to a ceramic green sheet that is to serve as an outer layer. The conductive paste may be, for example, one obtained by mixing a solvent, a binder resin, powdered metal (e.g., powdered Ni), and the like.

Subsequently, the ceramic green sheets are laminated in a predetermined order and are integrated by thermal compression, to produce unfired ceramic body 11 shown in FIG. 6A. In a common production line, in order to manufacture a large number of multilayer ceramic capacitors 100 with high productivity, the following is often performed. A mother ceramic green sheet is produced, conductive pastes 12, 13 are applied to the mother ceramic green sheets, and the mother ceramic green sheets are laminated and integrated by pressurization to produce an unfired mother ceramic body. Then, the unfired mother ceramic body is divided into pieces to produce unfired ceramic bodies 11.

Figure 6B:
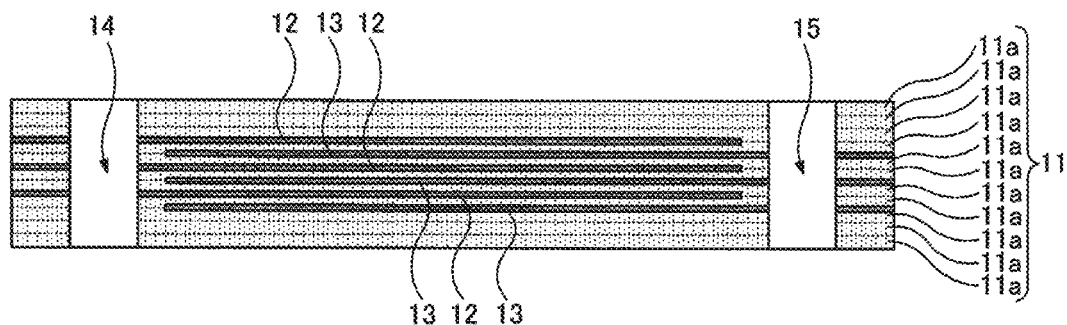

Subsequently, as shown in FIG. 6B, a through-hole 14 for forming first penetration portion 6 and a through-hole 15 for forming second penetration portion 7 are formed, which penetrate unfired ceramic body 11 between the opposite main surfaces thereof. Through-holes 14, 15 are formed by, for example, irradiation of a laser beam.

Figure 6C:
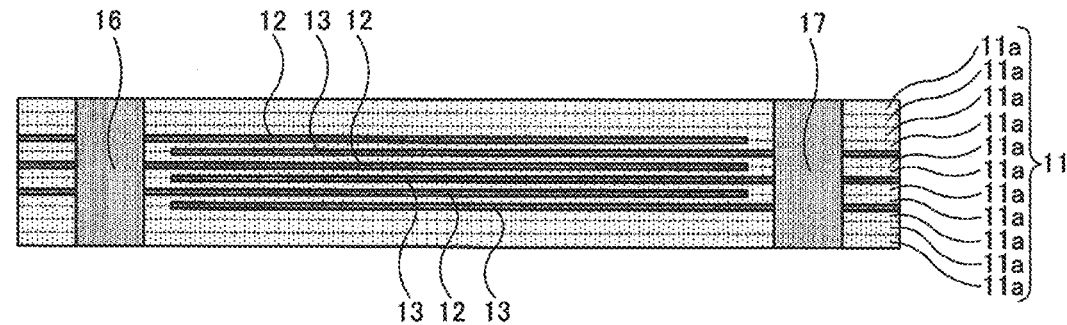

Subsequently, as shown in FIG. 6C, through-hole 14 is filled with a conductive paste 16 for forming first penetration portion 6 prepared in advance, and through-hole 15 is filled with a conductive paste 17 for forming second penetration portion 7 prepared in advance.

When the unfired mother ceramic body is produced, and the unfired mother ceramic body is divided into pieces to produce unfired ceramic bodies 11, as described above, unfired ceramic bodies 11 are preferably produced by forming through-holes 14, 15, filling through-hole 14 with conductive paste 16, filling through-hole 15 with conductive paste 17, and then dividing the unfired mother ceramic body into pieces.

Figure 7D:
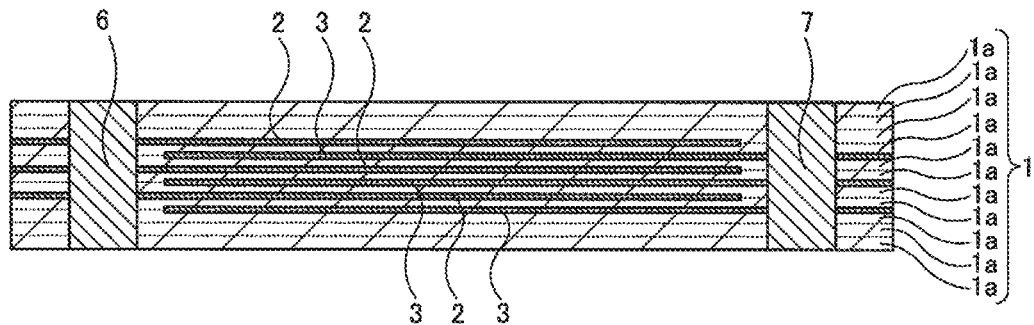
FIGS. 7D to 7F are a continuation of FIG. 6C and are diagrams for illustrating the process performed in the example method of manufacturing multilayer ceramic capacitor 100.

Subsequently, unfired ceramic body 11 is fired in a predetermined profile to complete ceramic body 1 shown in FIG. 7D. At this time, ceramic green sheet 11a may be fired into ceramic layer 1a, conductive pastes 12, 13 applied to the main surface of ceramic green sheet 11a are fired simultaneously into first internal electrode 2 and second internal electrode 3. Also, conductive paste 16 that fills through-hole 14 is fired into first penetration portion 6, and conductive paste 17 that fills through-hole 15 is fired into second penetration portion 7.

Figure 7E:
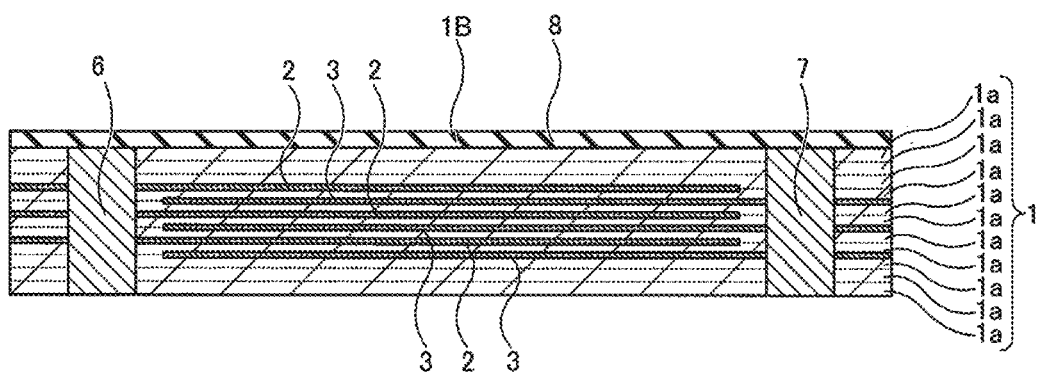

Subsequently, as shown in FIG. 7E, reinforcing layer 8 is provided on second main surface 1B of ceramic body 1. Although reinforcing layer 8 is made of DLC in the present preferred embodiment as described above, in this case, reinforcing layer 8 is made of, for example, aliphatic hydrocarbons, aromatic hydrocarbons, oxygenated hydrocarbons, nitrogen-including hydrocarbons, or the like, on second main surface 1B of ceramic body 1 by thermal CVD, plasma CVD, vacuum deposition, ion plating, sputtering, laser ablation, or the like. However, reinforcing layer 8 may be made of any other material or formed by any other method.

Figure 7F:
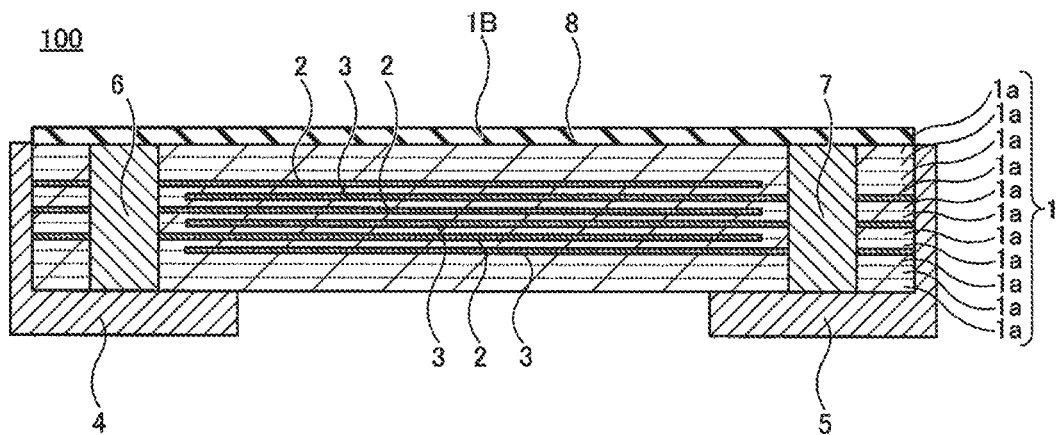

Subsequently, as shown in FIG. 7F, first external electrode 4 and second external electrode 5 are provided on surfaces of ceramic body 1. Specifically, the first layer is formed by applying and baking the conductive paste. Subsequently, the second layer, the third layer, and the fourth layer are each formed by plating.

Thus, multilayer ceramic capacitor 100 according to the first preferred embodiment is complete.

Second Preferred Embodiment

Figure 8:
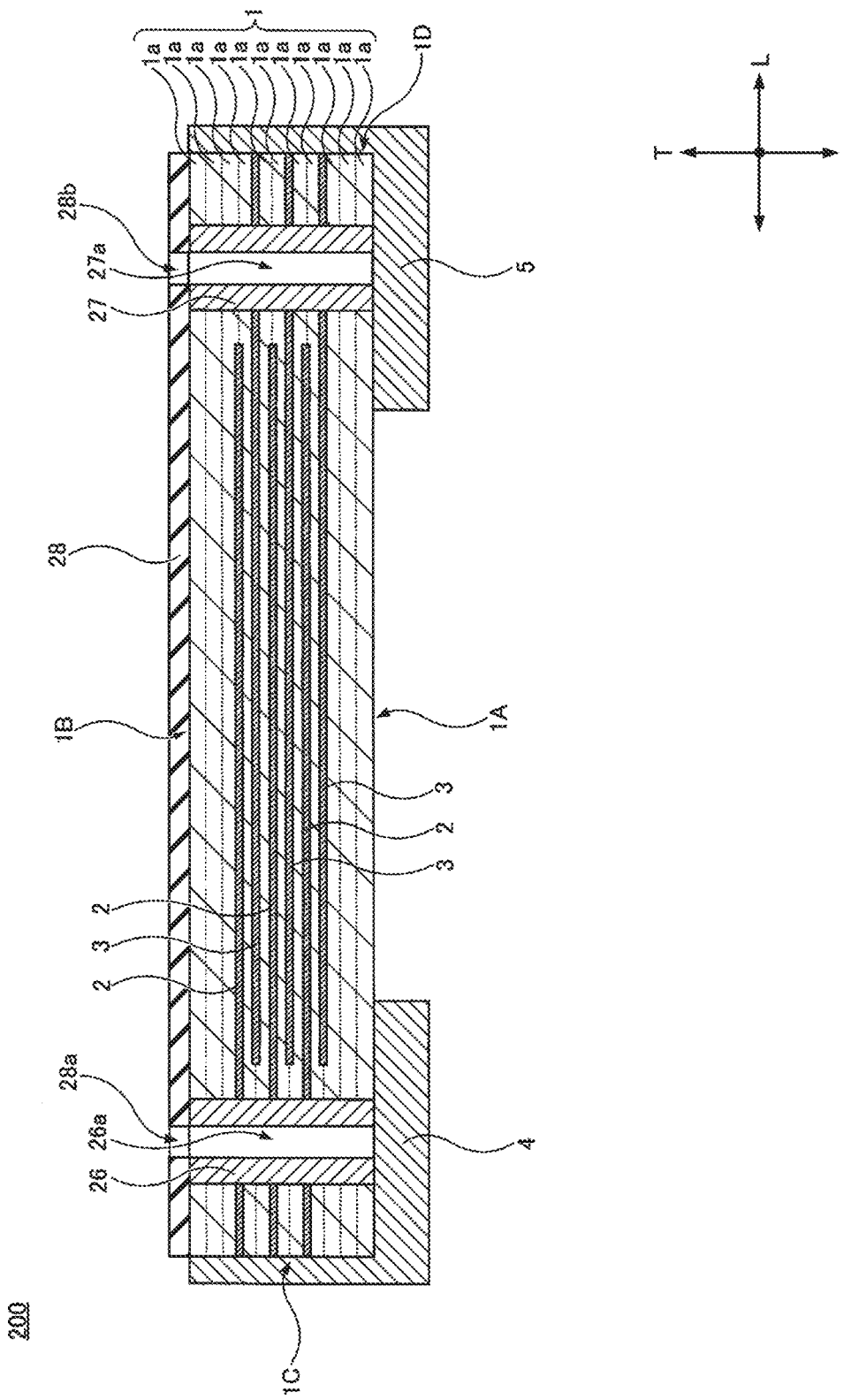
FIG. 8 is a sectional view of a multilayer ceramic capacitor 200.
Figure 9:
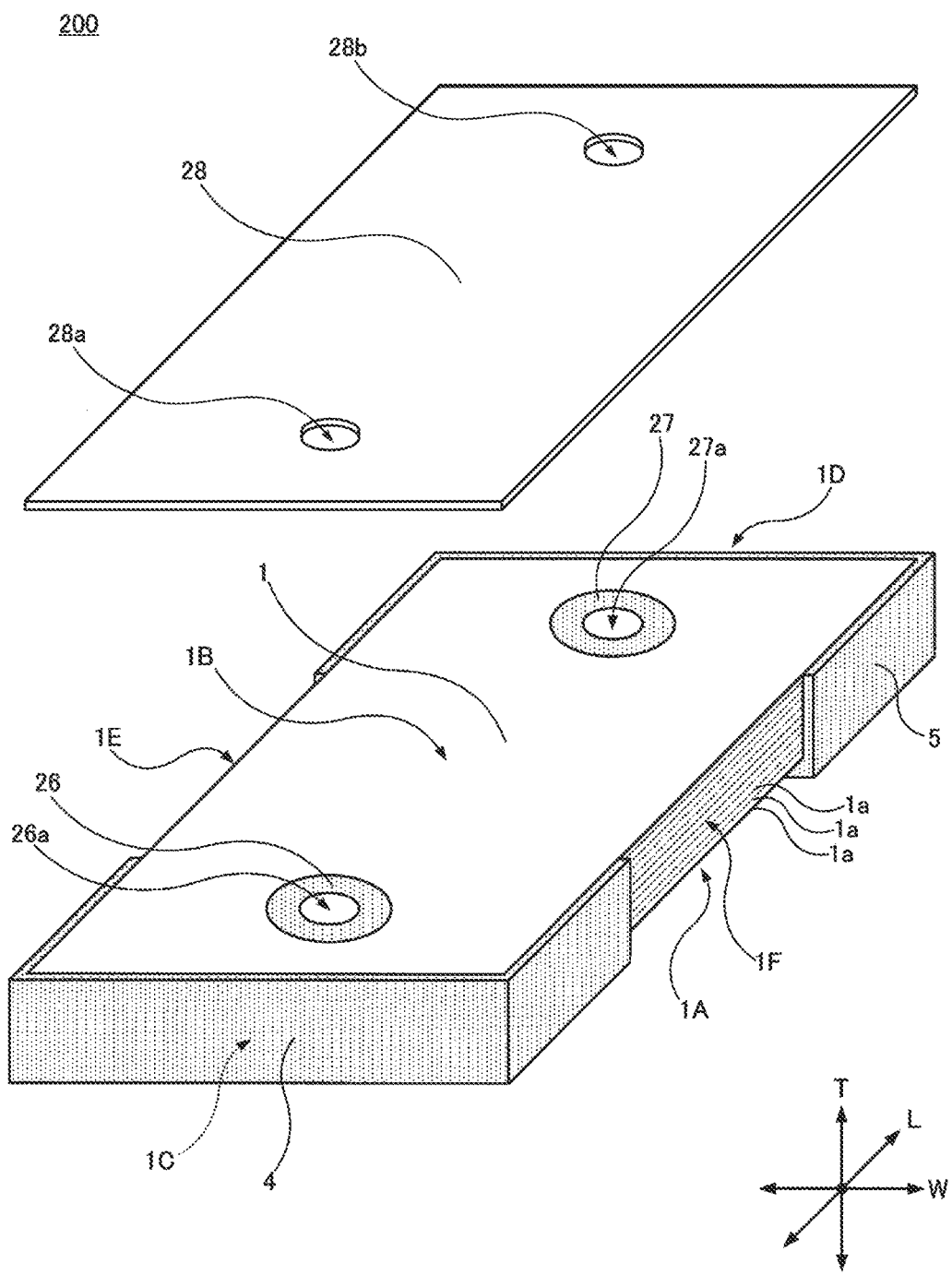
FIG. 9 is an exploded perspective view of multilayer ceramic capacitor 200.

FIGS. 8 and 9 show a multilayer ceramic capacitor 200 according to a second preferred embodiment. FIG. 8 is a sectional view of multilayer ceramic capacitor 200. FIG. 9 is an exploded perspective view of multilayer ceramic capacitor 200.

Multilayer ceramic capacitor 200 according to the second preferred embodiment is obtained by modifying part of the configuration of multilayer ceramic capacitor 100 according to the first preferred embodiment described above. Specifically, first penetration portion 6 and second penetration portion 7 each have a columnar shape (cylindrical shape) in multilayer ceramic capacitor 100. Such a configuration is changed in multilayer ceramic capacitor 200, and a first penetration portion 26 and a second penetration portion 27 each have a tubular shape (circular tube shape). In other words, first penetration portion 26 includes a hollow tubular portion 26a. Second penetration portion 27 includes a hollow tubular portion 27a. Tubular portions 26a, 27a may be filled with any other material (e.g., the material of a reinforcing layer 28). The circular tube shape of first penetration portion 26 and second penetration portion 27 may be replaced by any other tubular shape, such as a quadrangular tube shape or a pentagonal tube shape.

First penetration portion 26 and second penetration portion 27 may be made of any material, and are made of Ni, similarly to first penetration portion 6 and second penetration portion 7 of multilayer ceramic capacitor 100.

Also in multilayer ceramic capacitor 200, reinforcing layer 28 is provided on second main surface 1B of ceramic body 1, and besides, a hole 28a is provided in a portion corresponding to tubular portion 26a of first penetration portion 26 which is exposed to second main surface 1B of ceramic body 1, and a hole 28b is provided in a portion corresponding to tubular portion 27a of second penetration portion 27 which is exposed to second main surface 1B of ceramic body 1. Holes 28a, 28b are formed due to a manufacturing technique problem in the process of forming reinforcing layer 28. As described above, tubular portion 26a of first penetration portion 26 and tubular portion 27a of second penetration portion 27 may be filled with the material of reinforcing layer 28.

In multilayer ceramic capacitor 100, a crack may occur between first penetration portion 6 and ceramic body 1 and between second penetration portion 7 and ceramic body 1 upon application of an impact due to first penetration portion 6 and second penetration portion 7 having a solid column shape. In contrast, in multilayer ceramic capacitor 200, the generation of a crack is reduced or prevented between first penetration portion 26 and ceramic body 1 and between second penetration portion 27 and ceramic body 1 because each of first penetration portion 26 and second penetration portion 27 has a tube shape with a hollow portion (tubular portion 26a, tubular portion 27a).

Example Method of Manufacturing Multilayer Ceramic Capacitor 200

Multilayer ceramic capacitor 200 can be manufactured by, for example, a manufacturing method shown in FIGS. 10A 10C and 11D to 11F.

Figure 10A:
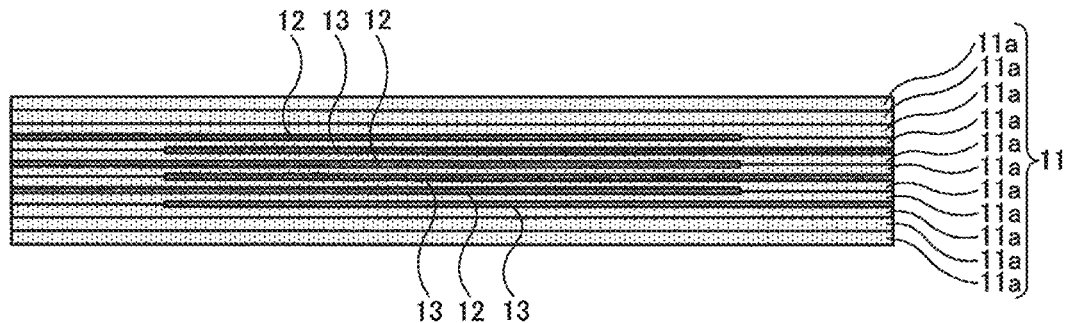
FIGS. 10A to 10C are diagrams for illustrating a process performed in an example method of manufacturing multilayer ceramic capacitor 200.

First, an unfired ceramic body 11 shown in FIG. 10A is produced.

Figure 10B:
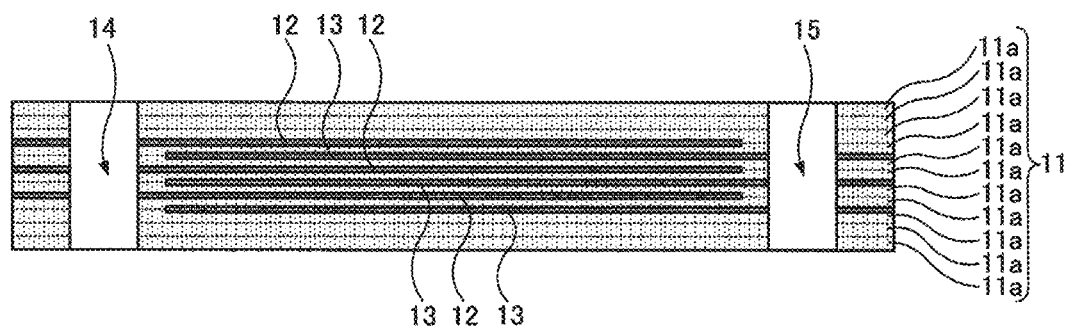

Subsequently, through-hole 14 for forming first penetration portion 26 and through-hole 15 for forming second penetration portion 27 are formed, which penetrate unfired ceramic body 11 between the opposite main surfaces thereof, as shown in FIG. 10B.

Figure 10C:
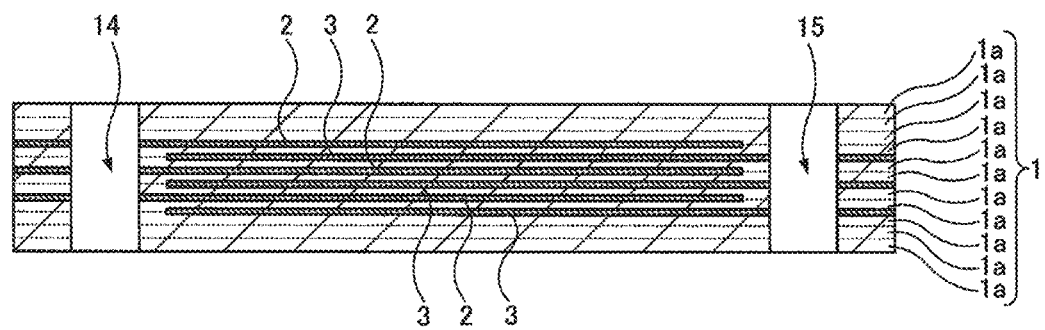

Subsequently, unfired ceramic body 11 is fired in a predetermined profile to complete ceramic body 1 shown in FIG. 10C.

Figure 11D:
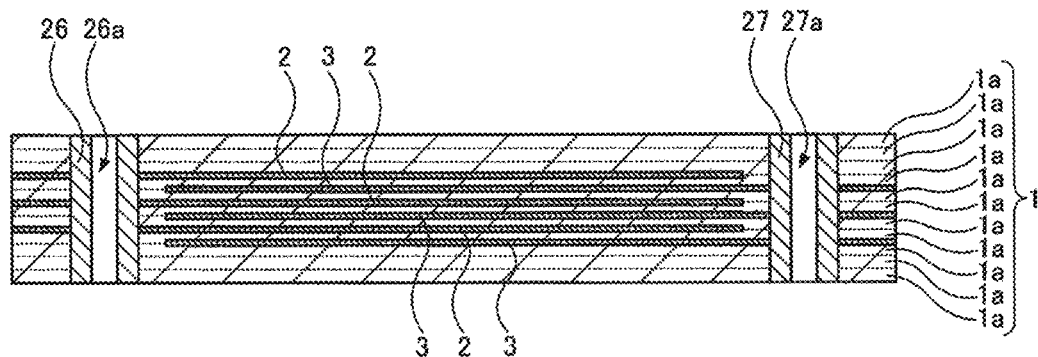
FIGS. 11D to 11F are a continuation of FIG. 10C and are diagrams showing a process performed in the example method of manufacturing multilayer ceramic capacitor 200.

Subsequently, as shown in FIG. 11D, first penetration portion 26 is formed inside through-hole 14 and second penetration portion 27 is formed inside through-hole 15 by plating, evaporation, sputtering, or the like. First penetration portion 26 has hollow tubular portion 26a, and second penetration portion 27 has hollow tubular portion 27a.

Figure 11E:
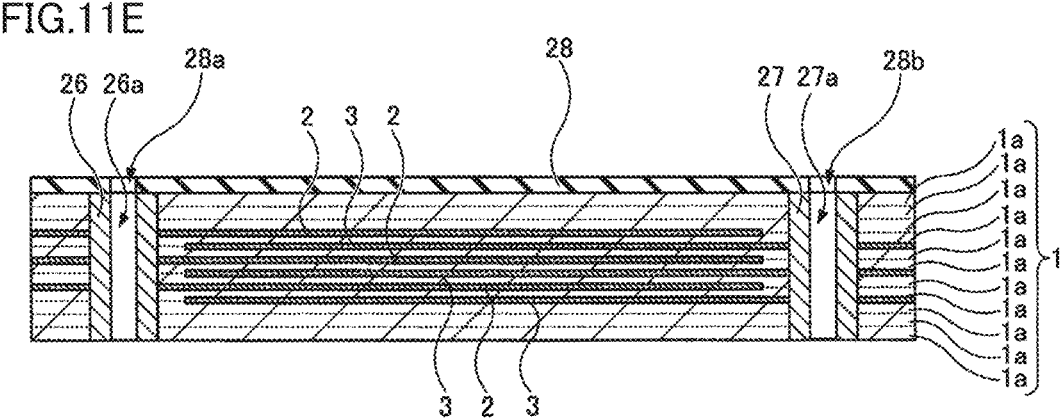

Subsequently, as shown in FIG. 11E, reinforcing layer 28 is formed on second main surface 1B of ceramic body 1. Reinforcing layer 28 formed has holes 28a, 28b.

Figure 11F:
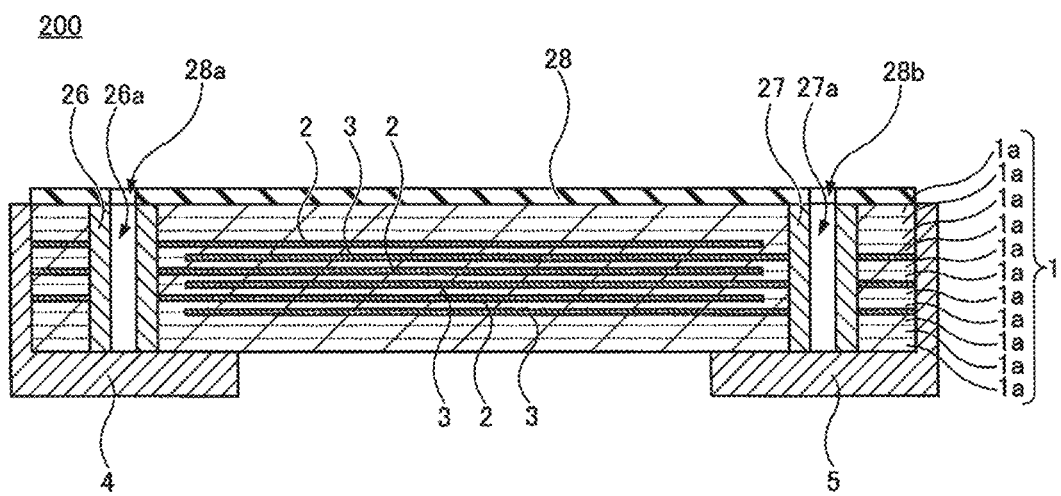

Finally, as shown in FIG. 11F, first external electrode 4 and second external electrode 5 are formed on surfaces of ceramic body 1 to complete multilayer ceramic capacitor 200 according to the second preferred embodiment.

Third Preferred Embodiment

FIGS. 12A to 12C show a multilayer ceramic capacitor 300 according to a third preferred embodiment. FIG. 12A is a perspective plan view of multilayer ceramic capacitor 300. FIG. 12B is a sectional view of multilayer ceramic capacitor 300, which shows a portion XIIB-XIIB indicated by the long-dashed short-dashed arrow in FIG. 12A. FIG. 12C is also a sectional view of multilayer ceramic capacitor 300, which shows a portion XIIC-XIIC indicated by the long-dashed short-dashed arrow in FIG. 12A.

Multilayer ceramic capacitor 300 according to the third preferred embodiment is obtained by modifying part of the configuration of multilayer ceramic capacitor 100 according to the first preferred embodiment described above. Specifically, in multilayer ceramic capacitor 100, first penetration portion 6 is electrically connected to first internal electrode 2. In multilayer ceramic capacitor 100, also, second penetration portion 7 is electrically connected to second internal electrode 3. In contrast, in multilayer ceramic capacitor 300, first penetration portion 36 is not electrically connected to first internal electrode 2, and second penetration portion 37 is not electrically connected to second internal electrode 3. In multilayer ceramic capacitor 300, an increased number of, that is, two first penetration portions 36 are provided on the opposite sides of first internal electrode 2 in width direction W, and an increased number of, that is two, second penetration portions 37 are provided on the opposite sides of second internal electrode 3 in width direction W.

In multilayer ceramic capacitor 300, first penetration portion 36 and first internal electrode 2 are not used for electrical connection, and thus, a metal material thereof can be changed to a non-conductive material, such as resin or rubber. First penetration portion 36 and first internal electrode 2 may be made of metal, and if they are made of resin or rubber, may mitigate an impact more effectively than when they are made of metal.

Also in multilayer ceramic capacitor 300, similarly to multilayer ceramic capacitor 100 according to the first preferred embodiment or the like, an impact is mitigated by reinforcing layer 8, first penetration portion 26, and second penetration portion 27. Thus, cracking or chipping of ceramic body 1 is reduced or prevented, and also, electrical disconnection between first internal electrode 2 and first external electrode 4 and electrical disconnection between second internal electrode 3 and second external electrode 5 are reduced or prevented.

Multilayer ceramic capacitor 300 includes an increased number of, that is, two first penetration portions 26, and an increased number of, that is, two second penetration portions 27, and accordingly, has an improved effect of mitigating an impact.

Fourth Preferred Embodiment

FIGS. 13A to 13C show a multilayer ceramic capacitor 400 according to a fourth preferred embodiment. FIG. 13A is a perspective plan view of multilayer ceramic capacitor 400. FIG. 13B is a sectional view of multilayer ceramic capacitor 400, which shows a portion XIIIB-XIIIB indicated by the long-dashed short-dashed arrow in FIG. 13A. FIG. 13C is a sectional view of multilayer ceramic capacitor 400, which shows a portion XIIIC-XIIIC indicated by the long-dashed short-dashed arrow in FIG. 13A.

Multilayer ceramic capacitor 400 according to the fourth preferred embodiment is obtained by further modifying multilayer ceramic capacitor 300 according to the third preferred embodiment described above. Specifically, though first penetration portion 26 and second penetration portion 27 have a columnar shape (cylindrical shape) in multilayer ceramic capacitor 300, a first penetration portion 46 and a second penetration portion 47 have a tubular shape (circular tube shape) in multilayer ceramic capacitor 400. In other words, first penetration portion 46 has a hollow tubular portion 46a, and second penetration portion 47 has a hollow tubular portion 47a. In multilayer ceramic capacitor 400, holes 48a are provided in the respective portions of reinforcing layer 48 which correspond to tubular portions 46a, 47a.

Also in multilayer ceramic capacitor 400, cracking or chipping of ceramic body 1 due to an impact is reduced or prevented, and also, electrical disconnection between first internal electrode 2 and first external electrode 4 and electrical disconnection between second internal electrode 3 and second external electrode 5 due to an impact are reduced or prevented.

Fifth Preferred Embodiment

Figure 14:
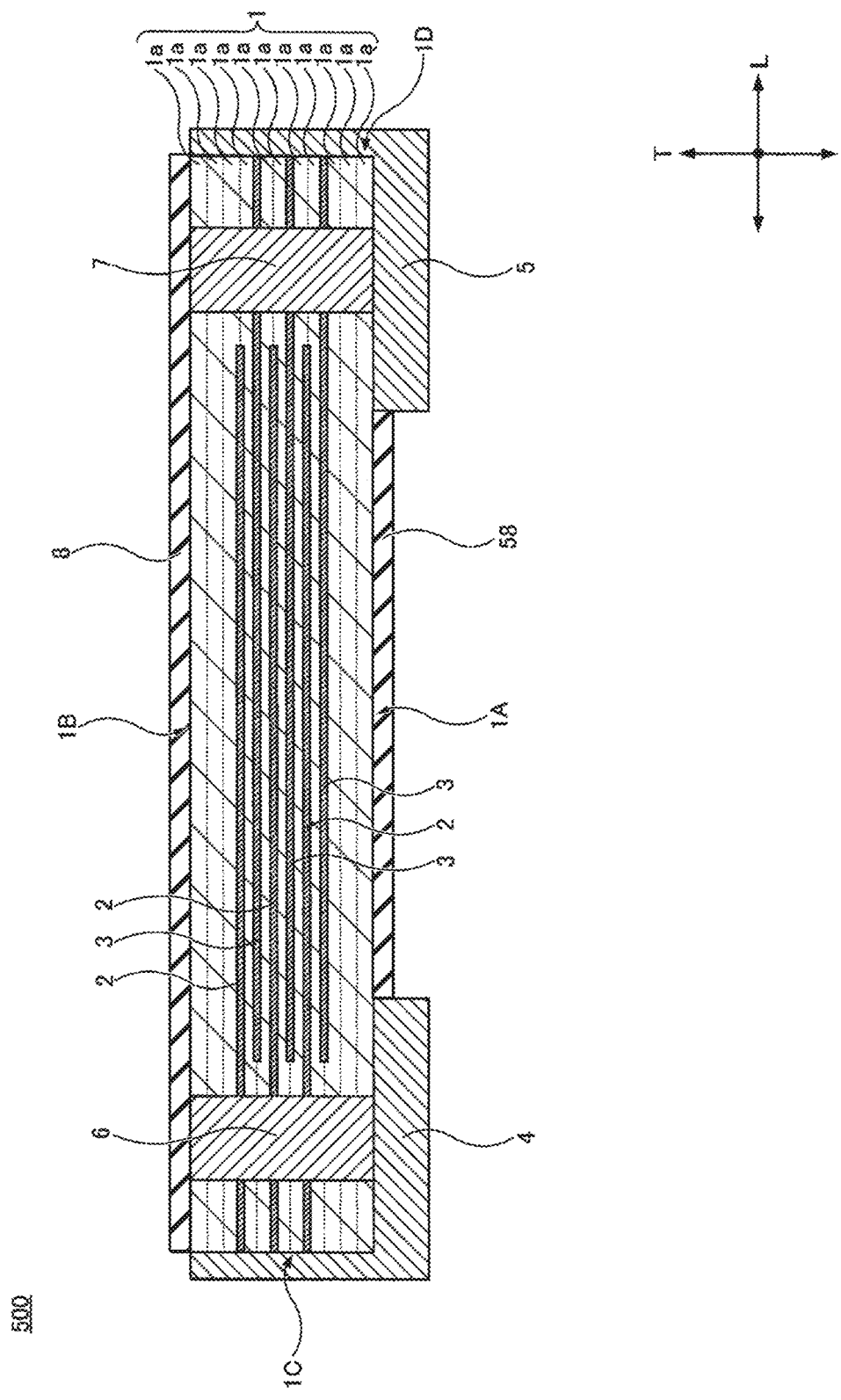
FIG. 14 is a sectional view of a multilayer ceramic capacitor 500.

FIG. 14 shows a multilayer ceramic capacitor 500 according to a fifth preferred embodiment. FIG. 14 is a sectional view of multilayer ceramic capacitor 500.

Multilayer ceramic capacitor 500 according to the fifth preferred embodiment is obtained by further adding a component to multilayer ceramic capacitor 100 according to the first preferred embodiment described above. Specifically, in multilayer ceramic capacitor 500, a second reinforcing layer 58 is provided on a portion of the first main surface of ceramic body 1 where first external electrode 4 and second external electrode 5 are not located.

Compared with multilayer ceramic capacitor 100, multilayer ceramic capacitor 500 is effective in reducing or preventing cracking or chipping of ceramic body 1 and reducing or preventing electrical disconnection between first internal electrode 2 and first external electrode 4 and electrical disconnection between second internal electrode 3 and second external electrode 5.

In multilayer ceramic capacitor 500, the shape of each of first penetration portion 6 and second penetration portion 7 may be changed from a columnar shape (cylindrical shape) to a tubular shape (e.g., circular tube shape) as in multilayer ceramic capacitor 200 according to the second preferred embodiment. In multilayer ceramic capacitor 500, also, first penetration portion 6 may not be electrically connected to first internal electrode 2, and second penetration portion 7 may not be electrically connected to second internal electrode 3, as in multilayer ceramic capacitor 300 according to the third preferred embodiment.

Sixth Preferred Embodiment

Figure 15:
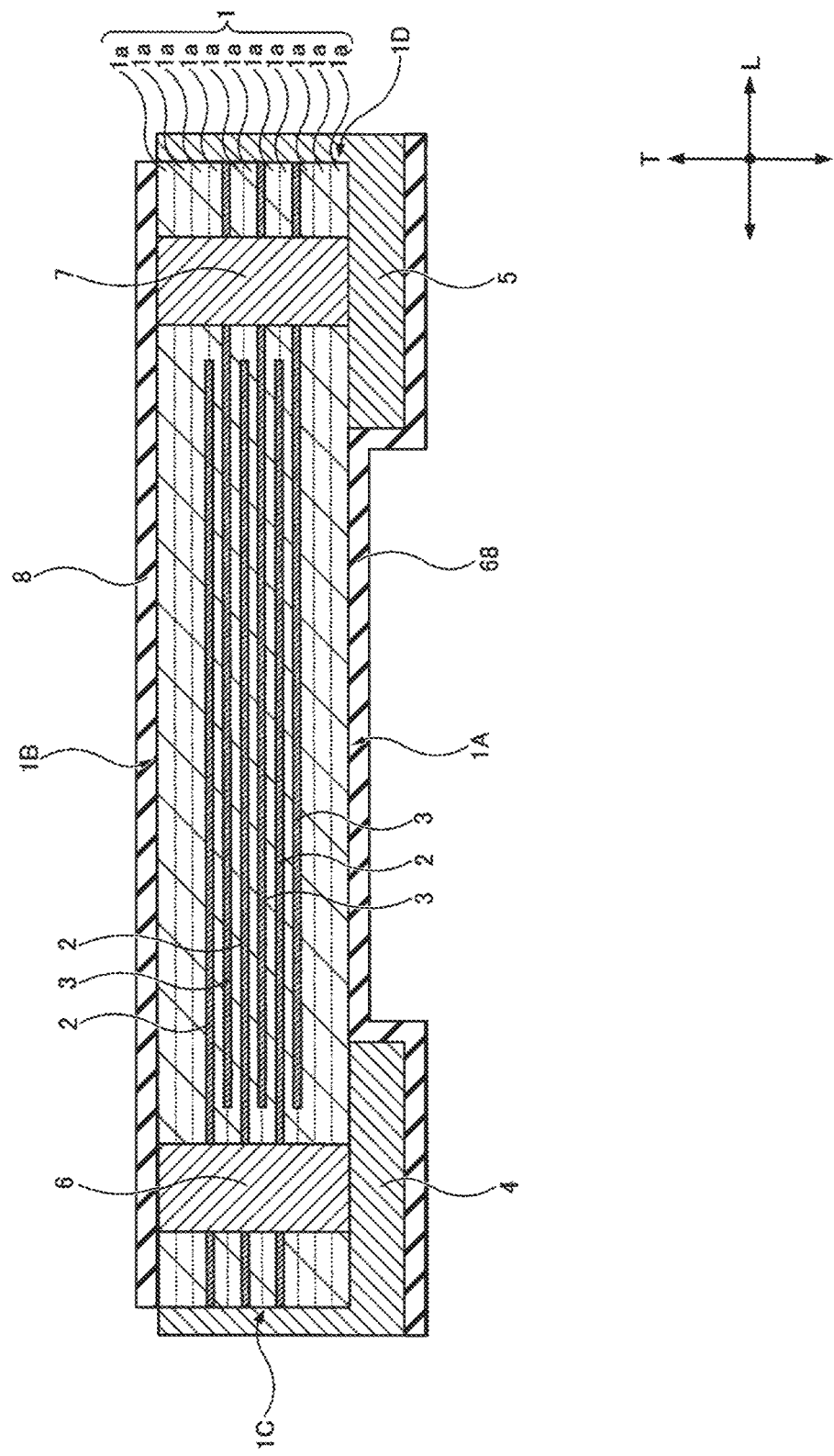
FIG. 15 is a sectional view of a multilayer ceramic capacitor 600.

FIG. 15 shows a multilayer ceramic capacitor 600 according to a sixth preferred embodiment. FIG. 15 is a sectional view of multilayer ceramic capacitor 600.

Multilayer ceramic capacitor 600 according to the sixth preferred embodiment is obtained by modifying part of the configuration of multilayer ceramic capacitor 500 according to the fifth preferred embodiment described above. Specifically, in multilayer ceramic capacitor 500, second reinforcing layer 58 is provided on the portion of the first main surface of ceramic body 1 where first external electrode 4 and second external electrode 5 are not provided. Such a configuration is changed in multilayer ceramic capacitor 600, and a second reinforcing layer 68 is provided on the entire first main surface 1A of ceramic body 1, including the portions in which first external electrode 4 and second external electrode 5 are provided, over first external electrode 4 and second external electrode 5.

Compared with multilayer ceramic capacitor 100, multilayer ceramic capacitor 600 is also effective in reducing or preventing cracking or chipping of ceramic body 1 and reducing or preventing electrical disconnection between first internal electrode 2 and first external electrode 4 and electrical disconnection between second internal electrode 3 and second external electrode 5.

When multilayer ceramic capacitor 600 is mounted on a substrate or the like, multilayer ceramic capacitor 600 may be fixed to the substrate for electrical connection by, for example, forming a solder fillet between first external electrode 4 provided on first end surface 1C of ceramic body 1 and an electrode of the substrate and forming a solder fillet between second external electrode 5 formed on second end surface 1D of ceramic body 1 and an electrode of the substrate.

Seventh Preferred Embodiment

Figure 16:
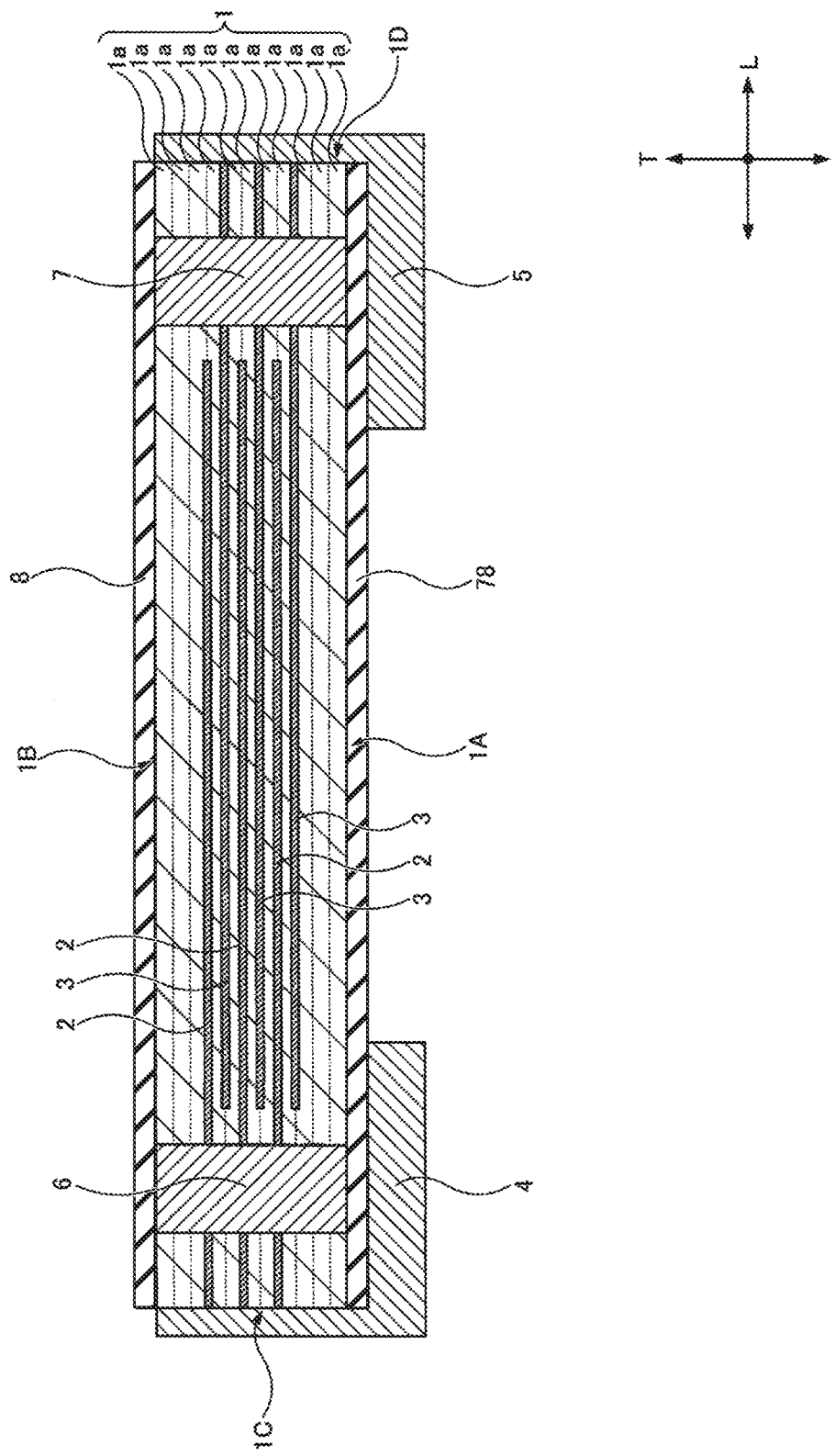
FIG. 16 is a sectional view of a multilayer ceramic capacitor 700.
Figure 17:
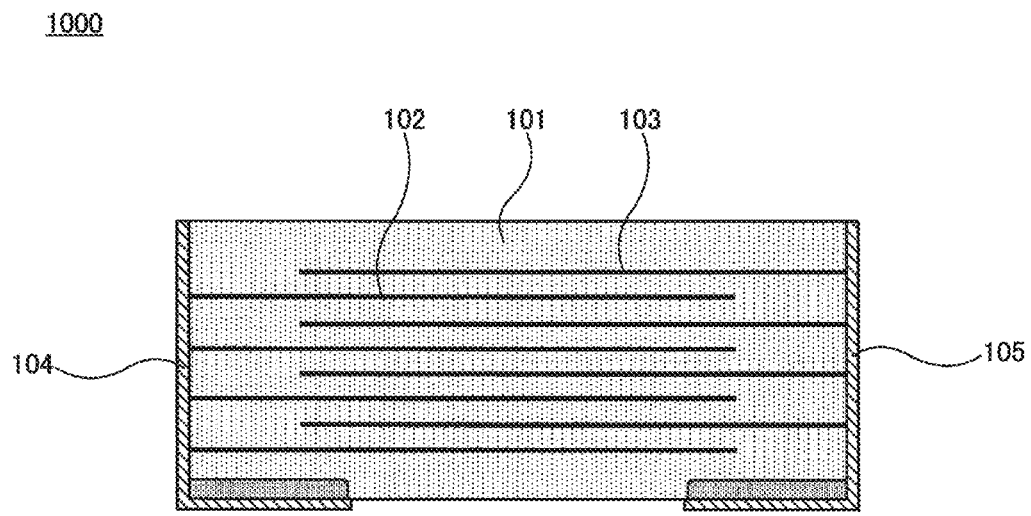
FIG. 17 is a sectional view of a multilayer ceramic capacitor 1000 disclosed in WO 2018/220901 A1.

FIG. 16 shows a multilayer ceramic capacitor 700 according to a seventh preferred embodiment. FIG. 16 is a sectional view of multilayer ceramic capacitor 700.

Multilayer ceramic capacitor 700 according to the seventh preferred embodiment is also obtained by modifying part of the configuration of multilayer ceramic capacitor 500 according to the fifth preferred embodiment described above. Specifically, in multilayer ceramic capacitor 500, second reinforcing layer 58 is provided on the portion of the first main surface of ceramic body 1 where first external electrode 4 and second external electrode 5 are not provided. Such a configuration is changed in multilayer ceramic capacitor 700, and second reinforcing layer 78 is provided on the entire first main surface 1A of ceramic body 1, and then, first external electrode 4 and second external electrode 5 are provided on second reinforcing layer 78.

Compared with multilayer ceramic capacitor 100, multilayer ceramic capacitor 700 is also effective in reducing or preventing cracking or chipping of ceramic body 1 and reducing or preventing electrical disconnection between first internal electrode 2 and first external electrode 4 and electrical disconnection between second internal electrode 3 and second external electrode 5.

Multilayer ceramic capacitors 100, 200, 300, 400, 500, 600, and 700 according to the first to seventh preferred embodiments have been described above. However, the present invention is not limited to the description above, and various modifications may be made in accordance with the gist of the present invention.

For example, though first penetration portion 6 and second penetration portion 7 have a cylindrical shape in multilayer ceramic capacitor 100 and the like, instead, they may have another columnar shape, such as a quadrangular prism shape or a pentagonal prism shape. Although first penetration portion 26 and second penetration portion 27 have a circular tube shape in multilayer ceramic capacitor 200 and the like, instead, they may have any other tubular shape such as a quadrangular tubular shape or a pentagonal tubular shape.

For example, in multilayer ceramic capacitor 200 in which first penetration portion 26 and second penetration portion 27 have tubular portions 26a, 27a, these tubular portions may be filled with any other material (e.g., the material of reinforcing layer 28).

For example, the number of each of first penetration portion 6 and second penetration portion 7 is one in multilayer ceramic capacitor 100 and the like, and the number of each of first penetration portions 36 and first internal electrodes 2 is two in multilayer ceramic capacitor 300. However, such numbers are arbitrary ones and can be increased or reduced.

The material of first penetration portions 6, 26, 36, 46 and second penetration portions 7, 27, 37, 47 is not limited to metal, and when electrical conduction is not required, these members may be made of a non-conductive material, such as resin or rubber.

Reinforcing layers 8, 28, 48 and second reinforcing layers 58, 68, 78 may be made of any material, and may be made of any material that can be expected to provide an impact mitigation effect, in addition to diamond-like carbon (DLC) described as an example. For example, resin or rubber may be used.

The multilayer ceramic capacitor according to a preferred embodiment of the present invention is as described in "SUMMARY OF THE INVENTION".

In this multilayer ceramic capacitor, preferably, at least one penetration portion is electrically conductive and is electrically connected to the first external electrode, and at least another one penetration portion is electrically conductive and is electrically connected to the second external electrode. In this case, the penetration portion can be used as a path for electrical connection.

Preferably, the conductive penetration portion electrically connected to the first external electrode is electrically connected to the first internal electrode, and the conductive penetration portion electrically connected to the second external electrode is electrically connected to the second internal electrode. In this case, the penetration portion can be used as an electrical connection path.

Preferably, the penetration portion is made of resin or rubber. In other words, when the penetration portion is not the only and essential electrical connection path, the penetration portion may be non-conductive. The penetration portion, which is made of resin or rubber, has an improved impact mitigation effect.

Preferably, the first internal electrode is electrically connected to the first external electrode on the first end surface of the ceramic body, and the second internal electrode is electrically connected to the second external electrode on the second end surface of the ceramic body. In various preferred embodiments of the present invention, electrical disconnection (breaking) between the first internal electrode and the first external electrode and electrical disconnection (breaking) between the second internal electrode and the second external electrode are reduced or prevented in these portions.

The penetration portion may have, for example, a columnar shape. Alternatively, the penetration portion may have, for example, a tubular shape.

Preferably, the material of the reinforcing layer is diamond-like carbon (DLC). In this case, cracking or chipping of the ceramic body can be reduced or prevented, and electrical disconnection between the internal electrode and the external electrode can be reduced or prevented.

The height dimension of the ceramic body is, for example, about 100 μm or less. Preferred embodiments of the present invention are useful particularly for an ultrathin ceramic body. The height dimension of the ceramic body may be smaller than about 100 μm, for example.

Preferably, the second reinforcing layer is provided on the first main surface of the ceramic body. In this case, the effect of reducing or preventing cracking or chipping of the ceramic body and the effect of reducing or preventing electrical disconnection between the internal electrode and the external electrode are improved further. The second reinforcing layer can be provided, for example, on the portion of the first main surface of the ceramic body where both the first external electrode and the second external electrode are not located.

Alternatively, the second reinforcing layer may be provided on the entire first main surface of the ceramic body, and part of the first external electrode and part of the second external electrode may be each provided on the second reinforcing layer. In this case, the effect of reducing or preventing cracking or chipping of the ceramic body and the effect of reducing or preventing electrical disconnection between the internal electrode and the external electrode can be improved without decreasing the functions of the first external electrode and the second external electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic body including a plurality of ceramic layers, a plurality of first internal electrodes, and a plurality of second internal electrodes laminated in a height direction, the ceramic body including a first main surface and a second main surface facing each other in the height direction, a first end surface and a second end surface facing each other in a length direction orthogonal to the height direction, and a first side surface and a second side surface facing each other in a width direction orthogonal to the height direction and the length direction;
   a first external electrode that is provided on at least part of the first end surface and on part of the first main surface and is not provided on the second main surface, the first external electrode being electrically connected to the plurality of first internal electrodes;
   a second external electrode that is provided on at least part of the second end surface and on part of the first main surface and is not provided on the second main surface, the second external electrode being electrically connected to the plurality of second internal electrodes;
   at least two penetration portions penetrating the ceramic body between the first main surface and the second main surface; and
   a reinforcing layer provided on at least part of the second main surface of the ceramic body, the reinforcing layer covering the at least two penetration portions exposed from the ceramic body; wherein
   the at least two penetration portions are made of a non-conductive resin or a non-conductive rubber; and
   at least one of the at least two penetration portions is in contact with the first external electrode provided on the first main surface.

2. The multilayer ceramic capacitor according to claim 1, wherein
   the plurality of first internal electrodes are electrically connected to the first external electrode on the first end surface of the ceramic body; and
   the plurality of second internal electrodes are electrically connected to the second external electrode on the second end surface of the ceramic body.

3. The multilayer ceramic capacitor according to claim 1, wherein each of the at least two penetration portions has a columnar shape.

4. The multilayer ceramic capacitor according to claim 1, wherein each of the at least two penetration portions has a tubular shape.

5. The multilayer ceramic capacitor according to claim 1, wherein the reinforcing layer is made of diamond-like carbon.

6. The multilayer ceramic capacitor according to claim 1, wherein the ceramic body has a height dimension of about 100 μm or less.

7. The multilayer ceramic capacitor according to claim 1, further comprising a second reinforcing layer provided on the first main surface of the ceramic body.

8. The multilayer ceramic capacitor according to claim 7, wherein the second reinforcing layer is provided on a portion of the first main surface of the ceramic body, both the first external electrode and the second external electrode being not provided on the portion.

9. The multilayer ceramic capacitor according to claim 7, wherein
   the second reinforcing layer is provided entirely on the first main surface of the ceramic body; and
   a portion of the first external electrode and a portion of the second external electrode are each provided on the second reinforcing layer.

10. The multilayer ceramic capacitor according to claim 1, wherein each of the at least two penetration portions has a cylindrical shape.

11. The multilayer ceramic capacitor according to claim 1, wherein each of the at least two penetration portions has a height equal or substantially equal to a height of the ceramic body.

12. The multilayer ceramic capacitor according to claim 1, wherein the reinforcing layer has a thickness of about 5 μm.

13. The multilayer ceramic capacitor according to claim 1, wherein the reinforcing layer only covers the at least two penetration portions.

14. The multilayer ceramic capacitor according to claim 1, wherein each of the first external electrode and the second external electrode are L-shaped or substantially L-shaped.

15. The multilayer ceramic capacitor according to claim 1, wherein each of the at least two penetration portions has a circular tubular shape, a quadrangular tube shape, or a pentagonal tube shape.

16. The multilayer ceramic capacitor according to claim 1, wherein each of the at least two penetration portions has a hollow tubular shape.

17. The multilayer ceramic capacitor according to claim 1, wherein at least one of the at least two penetration portions is in contact with each of the first external electrode provided on the first main surface and the reinforcing layer.

* * * * *